(12) United States Patent
Hindy et al.

(10) Patent No.: US 12,113,598 B2
(45) Date of Patent: *Oct. 8, 2024

(54) METHOD AND APPARATUS FOR GENERATING A CHANNEL STATE INFORMATION REPORT ADAPTED TO SUPPORT A PARTIAL OMISSION

(71) Applicant: Lenovo (Singapore) Pte. Ltd., New Tech Park (SG)

(72) Inventors: Ahmed Hindy, Forest Park, IL (US); Tyler Brown, Lake Zurich, IL (US); Udar Mittal, Rolling Meadows, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/133,264

(22) Filed: Apr. 11, 2023

(65) Prior Publication Data
US 2023/0254026 A1  Aug. 10, 2023

Related U.S. Application Data

(63) Continuation of application No. 17/279,917, filed as application No. PCT/IB2020/057340 on Aug. 3, 2020, now Pat. No. 11,637,608.

(Continued)

(51) Int. Cl.
*H04L 1/00* (2006.01)
*H04B 7/06* (2006.01)

(52) U.S. Cl.
CPC ......... *H04B 7/0645* (2013.01); *H04B 7/0626* (2013.01); *H04L 1/0079* (2013.01); *H04L 1/0088* (2013.01)

(58) Field of Classification Search
CPC ... H04B 7/0645; H04B 7/0626; H04L 1/0079; H04L 1/0088
See application file for complete search history.

(56) References Cited

U.S. PATENT DOCUMENTS

| | | | |
|---|---|---|---|
| 2008/0043873 A1* | 2/2008 | Ariyavisitakul | H04B 7/0617 375/267 |
| 2008/0123750 A1* | 5/2008 | Bronstein | H04N 19/436 375/240.24 |

(Continued)

OTHER PUBLICATIONS

3GPP TSG RAN WG1 Meeting RAN1#97R1-1907076, Reno, US, May 13-17, 2019 (Year: 2019).*

(Continued)

*Primary Examiner* — Atique Ahmed
(74) *Attorney, Agent, or Firm* — FIG. 1 Patents

(57) ABSTRACT

Generating a channel state information (CSI) feedback report is provided. A set of reference signals is received. A plurality of entries that are included in the CSI feedback report are computed, where the entries of the CSI feedback report include at least a set of coefficients. Each coefficient is associated with a set of indices including at least one or more of a spatial domain basis index, a frequency domain basis index, and a layer index. The plurality of entries of the CSI feedback report are arranged in an order known to both the user equipment and the network entity. The plurality of entries of the CSI feedback report are prioritized using indices corresponding to the set of indices, where a subset of the set of indices are permuted based on predefined permutations of the subset of the set of indices.

20 Claims, 15 Drawing Sheets

Related U.S. Application Data

(60) Provisional application No. 62/881,919, filed on Aug. 1, 2019.

(56) References Cited

U.S. PATENT DOCUMENTS

| | | | | |
|---|---|---|---|---|
| 2009/0092148 | A1* | 4/2009 | Zhang | H04L 5/0057 |
| | | | | 370/464 |
| 2010/0014584 | A1* | 1/2010 | Feder | H04N 19/18 |
| | | | | 375/240.12 |
| 2014/0072068 | A1 | 3/2014 | Zhu et al. | |
| 2017/0243589 | A1* | 8/2017 | Krueger | G10L 19/008 |
| 2019/0059013 | A1* | 2/2019 | Rahman | H04B 7/0478 |
| 2019/0199477 | A1* | 6/2019 | Park | H04W 72/1268 |
| 2019/0334587 | A1* | 10/2019 | Rahman | H04B 7/0486 |
| 2020/0204312 | A1* | 6/2020 | Xu | H04L 5/0035 |

OTHER PUBLICATIONS

3GPP TSG RAN WG1 Meeting RAN1#97R1-1907076, Reno, US, May 13-17, 2019 (Year: 2019) (Year: 2019).*
Notice of References Cited—PTO-892 in Notice of Allowance for U.S. Appl. No. 17/279,986, Mittel et al., mailing date—Jun. 7, 2023.

* cited by examiner

*300*

| $\ell=0$ | 1 | 0 | 0 | 0 |
|---|---|---|---|---|
| | 1 | 1 | 1 | 0 |
| | 1 | 1 | 0 | 1 |
| | 0 | 1 | 0 | 0 |

| $\ell=1$ | 1 | 1 | 0 | 0 |
|---|---|---|---|---|
| | 0 | 0 | 0 | 1 |
| | 1 | 0 | 1 | 1 |
| | 1 | 1 | 0 | 0 |

| $\ell=2$ | 1 | 1 | 1 | 0 |
|---|---|---|---|---|
| | 1 | 1 | 0 | 0 |
| | 1 | 0 | 1 | 0 |
| | 0 | 0 | 0 | 1 |

| $\ell=3$ | 1 | 0 | 0 | 1 |
|---|---|---|---|---|
| | 1 | 0 | 0 | 0 |
| | 1 | 1 | 1 | 0 |
| | 1 | 0 | 0 | 1 |

| $G_0$ | $G_1$ | ... | $G_{S-2}$ | $G_{S-1}$ |
|---|---|---|---|---|

| SD BASIS INDEX \ FD BASIS INDEX | j=0 | j=1 | j=2 | j=3 | LAYER INDEX |
|---|---|---|---|---|---|
| i=0 | <u>1</u> | 0 | 0 | 0 | ℓ=0 |
|     | <u>1</u> | 1 | 0 | 0 | ℓ=1 |
|     | <u>1</u> | 1 | 1 | 0 | ℓ=2 |
|     | <u>1</u> | 0 | 0 | 1 | ℓ=3 |
| i=1 | 1 | 1 | 1 | 0 | ℓ=0 |
|     | 0 | 0 | 0 | 1 | ℓ=1 |
|     | 1 | 1 | 0 | 0 | ℓ=2 |
|     | 1 | 0 | 0 | 0 | ℓ=3 |
| i=2 | 1 | 1 | 0 | 1 | ℓ=0 |
|     | 1 | 0 | 1 | 1 | ℓ=1 |
|     | 1 | 0 | 1 | 0 | ℓ=2 |
|     | 1 | 1 | 1 | 0 | ℓ=3 |
| i=3 | 0 | 1 | 0 | 0 | ℓ=0 |
|     | 1 | 1 | 0 | 0 | ℓ=1 |
|     | 0 | 0 | 0 | 1 | ℓ=2 |
|     | 1 | 0 | 0 | 1 | ℓ=3 |

| SD BASIS INDEX \ FD BASIS INDEX | j=0 | j=1 | j=2 | j=3 | LAYER INDEX |
|---|---|---|---|---|---|
| i=0 | 1 | 0 | 0 | 0 | ℓ=0 |
| i=1 | 1 | 1 | 1 | 0 | |
| i=2 | 1 | 1 | 0 | 1 | |
| i=3 | 0 | 1 | 0 | 0 | |
| i=0 | 1 | 1 | 0 | 0 | ℓ=1 |
| i=1 | 0 | 0 | 0 | 1 | |
| i=2 | 1 | 0 | 1 | 1 | |
| i=3 | 1 | 1 | 0 | 0 | |
| i=0 | 1 | 1 | 1 | 0 | ℓ=2 |
| i=1 | 1 | 1 | 0 | 0 | |
| i=2 | 1 | 0 | 1 | 0 | |
| i=3 | 0 | 0 | 0 | 1 | |
| i=0 | 1 | 0 | 0 | 1 | ℓ=3 |
| i=1 | 1 | 0 | 0 | 0 | |
| i=2 | 1 | 1 | 1 | 0 | |
| i=3 | 1 | 0 | 0 | 1 | |

| FD BASIS INDEX / SD BASIS INDEX | j=0 | j=3 | j=1 | j=2 | LAYER INDEX |
|---|---|---|---|---|---|
| i=0 | <u>1</u> | 0 | 0 | 0 | ℓ=0 |
| i=1 | 1 | 0 | 1 | 1 | |
| i=2 | 1 | 1 | 1 | 0 | |
| i=3 | 0 | 0 | 1 | 0 | |
| i=0 | <u>1</u> | 0 | 1 | 0 | ℓ=1 |
| i=1 | 0 | 1 | 0 | 0 | |
| i=2 | 1 | 1 | 0 | 1 | |
| i=3 | 1 | 0 | 1 | 0 | |
| i=0 | <u>1</u> | 0 | 1 | 1 | ℓ=2 |
| i=1 | 1 | 0 | 1 | 0 | |
| i=2 | 1 | 0 | 0 | 1 | |
| i=3 | 0 | 1 | 0 | 0 | |
| i=0 | <u>1</u> | 1 | 0 | 0 | ℓ=3 |
| i=1 | 1 | 0 | 0 | 0 | |
| i=2 | 1 | 0 | 1 | 1 | |
| i=3 | 1 | 1 | 0 | 0 | |

| SD BASIS INDEX / FD BASIS INDEX | i=0 | i=1 | i=2 | i=3 | LAYER INDEX |
|---|---|---|---|---|---|
| j=0 | <u>1</u> | 1 | 1 | 0 | ℓ=0 |
| j=1 | 0 | 1 | 1 | 1 | |
| j=2 | 0 | 1 | 0 | 0 | |
| j=3 | 0 | 0 | 1 | 0 | |
| j=0 | <u>1</u> | 0 | 1 | 1 | ℓ=1 |
| j=1 | 1 | 0 | 0 | 1 | |
| j=2 | 0 | 0 | 1 | 0 | |
| j=3 | 0 | 1 | 1 | 0 | |
| j=0 | <u>1</u> | 1 | 1 | 0 | ℓ=2 |
| j=1 | 1 | 1 | 0 | 0 | |
| j=2 | 1 | 0 | 1 | 0 | |
| j=3 | 0 | 0 | 0 | 1 | |
| j=0 | <u>1</u> | 1 | 1 | 1 | ℓ=3 |
| j=1 | 0 | 0 | 1 | 0 | |
| j=2 | 0 | 0 | 1 | 0 | |
| j=3 | 1 | 0 | 0 | 1 | |

| SD BASIS INDEX / FD BASIS INDEX | i=2 | i=1 | i=3 | i=0 | LAYER INDEX |
|---|---|---|---|---|---|
| j=0 | 1 | 1 | 0 | <u>1</u> | ℓ=0 |
| j=1 | 1 | 1 | 1 | 0 | |
| j=2 | 0 | 1 | 0 | 0 | |
| j=3 | 1 | 0 | 0 | 0 | |
| j=0 | 1 | 0 | 1 | <u>1</u> | ℓ=1 |
| j=1 | 0 | 0 | 1 | 1 | |
| j=2 | 1 | 0 | 0 | 0 | |
| j=3 | 1 | 1 | 0 | 0 | |
| j=0 | 1 | 1 | 0 | <u>1</u> | ℓ=2 |
| j=1 | 0 | 1 | 0 | 1 | |
| j=2 | 1 | 0 | 0 | 1 | |
| j=3 | 0 | 0 | 1 | 0 | |
| j=0 | 1 | 1 | 1 | <u>1</u> | ℓ=3 |
| j=1 | 1 | 0 | 0 | 0 | |
| j=2 | 1 | 0 | 0 | 0 | |
| j=3 | 0 | 0 | 1 | 1 | |

| $G_0$ | $G_1$ | $G_2$ | $G_3$ | $G_4$ |
|---|---|---|---|---|
| WB PARAMETERS (NOT INCLUDING BITMAP BITS) | BITMAP BITS (2LM BITS) | HIGHEST ORDER MAGNITUDE BITS OF ALL NON-ZERO COEFFICIENTS $\{\lambda^0_{lm-1}\lambda^1_{lm-1},\ldots,\lambda^{KNZ-2}_{lm-1}\}$ | REMAINING MAGNITUDE AND PHASE BITS OF NON-ZERO COEFFICIENTS WITH $\lambda^p_{lm-1}=1$ $\{\lambda^p_{lm-2},\ldots,\lambda^p_0\varphi^p_{lp-1},\ldots,\varphi^p_0\}$ $\{\lambda^q_{lm-2},\ldots,\lambda^q_0\varphi^q_{lp-1},\ldots,\varphi^q_0\}$ | REMAINING MAGNITUDE BITS FOLLOWED BY PHASE BITS OF ALL NON-ZERO COEFFICIENTS WHERE $\lambda^r_{lm-1}=0$. $\{\lambda^r_{lm-2},\ldots,\lambda^r_0\varphi^r_{lp-1},\ldots,\varphi^r_0\}$ |

| $G_0$ | $G_1$ | $G_2$ | $G_3$ | $G_4'$ | $G_5'$ | $G_6'$ |
|---|---|---|---|---|---|---|
| WB PARAMETERS (NOT INCLUDING BITMAP BITS) | BITMAP BITS (2LM BITS) | HIGHEST ORDER MAGNITUDE BITS $\lambda^k_{lm-1}$ OF ALL NON-ZERO COEFFICIENTS $\{\lambda^0_{lm-1}\lambda^1_{lm-1},\ldots,\lambda^{KNZ-2}_{lm-1}\}$ | REMAINING MAGNITUDE AND PHASE BITS OF NON-ZERO COEFFICIENTS WITH $\lambda^p_{lm-1}=1$ $\{\lambda^p_{lm-2},\ldots,\lambda^p_0\varphi^p_{lp-1},\ldots,\varphi^p_0\}$ $\{\lambda^q_{lm-2},\ldots,\lambda^q_0\varphi^q_{lp-1},\ldots,\varphi^q_0\}$ | SECOND-HIGHEST ORDER MAGNITUDE BITS OF NON-ZERO COEFFICIENTS WITH $\lambda^k_{lm-1}=0$. $\{\lambda^{r0}_{lm-2}\lambda^{r1}_{lm-2},\ldots,\lambda^{rK-1}_{lm-2}\}$ | REMAINING MAGNITUDE AND PHASE BITS OF NON-ZERO COEFFICIENTS WITH $\lambda^k_{lm-1}=0$, $\lambda^k_{lm-2}=1$ $\{\lambda^r_{lm-3},\ldots,\lambda^r_0\varphi^r_{lp-1},\ldots,\varphi^r_0\}$ | REMAINING MAGNITUDE AND PHASE BITS OF NON-ZERO COEFFICIENTS WITH $\lambda^k_{lm-1}=\lambda^k_{lm-2}=0$ $\{\lambda^q_{lm-3},\ldots,\lambda^q_0\varphi^q_{lp-1},\ldots,\varphi^q_0\}$ |

METHOD AND APPARATUS FOR GENERATING A CHANNEL STATE INFORMATION REPORT ADAPTED TO SUPPORT A PARTIAL OMISSION

FIELD OF THE INVENTION

The present disclosure is directed to a method and apparatus related to generating a channel state information report, including the generation of a channel state information report where the contents of the information report have been organized in a descending order of significance in order to more readily support a partial transmission.

BACKGROUND OF THE INVENTION

Presently, user equipment, such as wireless communication devices, communicate with other communication devices using wireless signals, such as within a network environment that can include one or more cells within which various communication connections with the network and other devices operating within the network can be supported. Network environments often involve one or more sets of standards, which each define various aspects of any communication connection being made when using the corresponding standard within the network environment. Examples of developing and/or existing standards include new radio access technology (NR), Long Term Evolution (LTE), Universal Mobile Telecommunications Service (UMTS), Global System for Mobile Communication (GSM), and/or Enhanced Data GSM Environment (EDGE).

In an effort to enhance system performance, more recent standards have looked at different forms of spatial diversity including different forms of multiple input multiple output (MIMO) systems, which involve the use of multiple antennas at each of the source and the destination of the wireless communication for multiplying the capacity of the radio link through the use of multipath propagation. Such a system makes increasingly possible the simultaneous transmission and reception of more than one data signal using the same radio channel.

As part of supporting MIMO communications, the network and user equipment can share and make use of channel state information, which can be used to help define the nature of the adopted beams, which are then used to support a particular data connection. In at least some wireless communication systems, channel state information (CSI) feedback is used to report on current channel conditions. This can be increasingly useful in frequency division duplexing (FDD) and frequency division multiple access (FDMA) systems where the downlink (DL) and uplink (UL) channels are not reciprocal. With multi-user (MU)-MIMO and spatial multiplexing, a receiving device, such as a user equipment (UE), may need to report channel conditions for multiple channels or beams. Accordingly, much overhead may be dedicated to CSI reporting in MU-MIMO and spatial multiplexing systems.

In formulating a channel state information feedback report, there are instances where the amount of information that has been identified as being desirable to be reported may exceed the amount of resources that have been assigned for communicating the information. In such an instance, it may be appropriate to reduce the amount of information being conveyed so as to fit within the size constraints associated with the resources that have been allocated to support the transmission. Any such reduction in the amount or the types of information being communicated needs to be coordinated between the user equipment and the network.

The present inventors have recognized that it may be possible to organize the information contained in the channel state information being planned to be reported, such that more statistically significant information is arranged toward the beginning of the information to be reported, and less statistically significant information is arranged toward the end of the information to be reported. In this way, the information can be truncated an appropriate amount, so as to be able to fit within the resource allocation constraints, by omitting an appropriate amount of the less statistically significant information, that has been purposely located proximate the end of the organized information.

SUMMARY

The present application provides a method in a user equipment for generating a channel state information feedback report. The method includes receiving a set of reference signals transmitted from a network entity. A plurality of entries that are included in the channel state information feedback report based on the received set of reference signals are computed, where the entries of the channel state information feedback report include at least a set of coefficients. Each coefficient is associated with at least one or more of a spatial domain basis index, a frequency domain basis index, and a layer index. The plurality of entries of the channel state information feedback report are arranged in an order known to both the user equipment and the network entity, where higher prioritized entries are positioned toward a beginning of the order of the arranged entries, and lower prioritized entries are positioned toward an end of the order of the arranged entries. At least a portion of the channel state information feedback report includes one or more concatenated groups. The plurality of entries of the channel state information feedback report are prioritized using predefined permutations of the indices for one or more of the frequency domain basis indices, the spatial domain basis indices, and the layer indices of the plurality of entries.

According to another possible embodiment, a user equipment for generating a channel state information feedback report is provided. The user equipment includes a transceiver that receives a set of reference signals transmitted from a network entity, and a controller that computes a plurality of entries that are included in the channel state information feedback report based on the received set of reference signals, where the entries of the channel state information feedback report include at least a set of coefficients. Each coefficient is associated with at least one or more of a spatial domain basis index, a frequency domain basis index, and a layer index. The plurality of entries of the channel state information feedback report are arranged by the controller in an order known to both the user equipment and the network entity, where higher prioritized entries are positioned toward a beginning of the order of the arranged entries, and lower prioritized entries are positioned toward an end of the order of the arranged entries. At least a portion of the channel state information feedback report includes one or more concatenated groups. The plurality of entries of the channel state information feedback report are prioritized using predefined permutations of the indices for one or more of the frequency domain basis indices, the spatial domain basis indices, and the layer indices of the plurality of entries.

According to a further possible embodiment, a method in a network entity is provided. The method includes transmitting a set of reference signals transmitted from a base station, and receiving a channel state information feedback report from a user equipment, where a plurality of entries that are included in the channel state information feedback report are computed by the user equipment based on the transmitted set of reference signals, where the entries of the channel state information feedback report include at least a set of coefficients. Each coefficient is associated with at least one or more of a spatial domain basis index, a frequency domain basis index, and a layer index. The plurality of entries of the channel state information feedback report are arranged in an order known to both the user equipment and the network entity, where higher prioritized entries are positioned toward a beginning of the order of the arranged entries, and lower prioritized entries are positioned toward an end of the order of the arranged entries. At least a portion of the channel state information feedback report includes one or more concatenated groups. The plurality of entries of the channel state information feedback report are prioritized using predefined permutations of the indices for one or more of the frequency domain basis indices, the spatial domain basis indices, and the layer indices of the plurality of entries.

According to a still further possible embodiment, a network entity including at least one base station for generating a channel state information report corresponding to a particular user equipment is provided. The network entity includes a controller, and a transceiver that transmits a set of reference signals transmitted from a base station, and receives a channel state information feedback report from a user equipment, where a plurality of entries that are included in the channel state information feedback report are computed by the user equipment based on the transmitted set of reference signals. The entries of the channel state information feedback report include at least a set of coefficients, and each coefficient is associated with at least one or more of a spatial domain basis index, a frequency domain basis index, and a layer index. The plurality of entries of the channel state information feedback report are arranged in an order known to both the user equipment and the network entity, where higher prioritized entries are positioned toward a beginning of the order of the arranged entries, and lower prioritized entries are positioned toward an end of the order of the arranged entries. At least a portion of the channel state information feedback report includes one or more concatenated groups. The plurality of entries of the channel state information feedback report are prioritized using predefined permutations of the indices for one or more of the frequency domain basis indices, the spatial domain basis indices, and the layer indices of the plurality of entries.

These and other features, and advantages of the present application are evident from the following description of one or more preferred embodiments, with reference to the accompanying drawings.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

FIG. 3 is an example of coefficient bit maps for rank-4 transmission;

FIG. 4 is an example of a channel state information feedback arrangement for part 2 of a channel state information report;

FIG. 5 is a pictorial view of a super-bitmap including information from the 4 bitmaps in FIG. 3 organized with an example of a preselected coefficient priority;

FIG. 6 is a pictorial view of a super-bitmap including information from the 4 bitmaps in FIG. 3 organized with another example of a preselected coefficient priority;

FIG. 7 is a pictorial view of a super-bitmap including information from the 4 bitmaps in FIG. 3 organized with a further example of a preselected coefficient priority;

FIG. 8 is a pictorial view of a super-bitmap including information from the 4 bitmaps in FIG. 3 organized with a still further example of a preselected coefficient priority;

FIG. 9 is a pictorial view of a super-bitmap including information from the 4 bitmaps in FIG. 3 organized with yet a still further example of a preselected coefficient priority;

FIG. 11 is a channel state information feedback arrangement for a portion of a channel state information report incorporating a coefficient information permutation based on a most significant magnitude bit;

FIG. 12 is a channel state information feedback arrangement for a portion of a channel state information report incorporating a coefficient information permutation based on the two most significant magnitude bits;

DETAILED DESCRIPTION OF THE PREFERRED EMBODIMENT(S)

Figure 1:
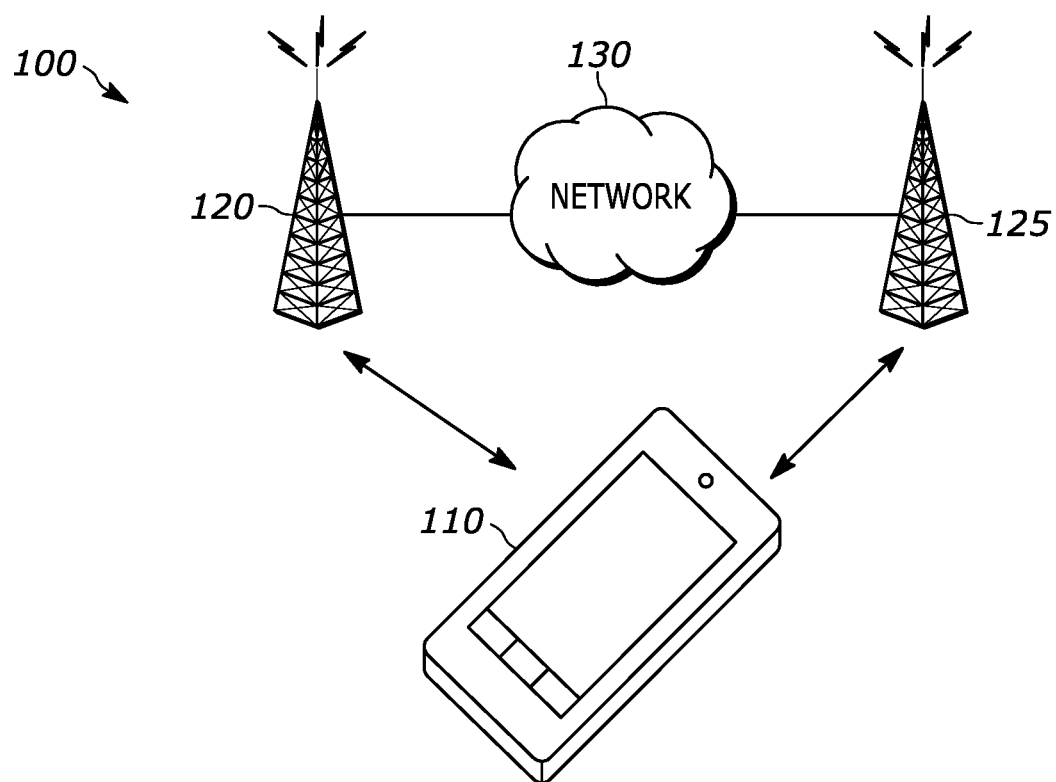
FIG. 1 is an example block diagram of a system according to a possible embodiment.

While the present disclosure is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Embodiments provide a method and apparatus for generation of a channel state information report, including the location of the entries in the report being organized based upon one or more selection criteria.

FIG. 1 is an example block diagram of a system 100 according to a possible embodiment. The system 100 can include a User Equipment (UE) 110, at least one network entity 120 and 125, such as a base station, and a network 130. The UE 110 can be a wireless wide area network device, a user device, wireless terminal, a portable wireless communication device, a smartphone, a cellular telephone, a flip phone, a personal digital assistant, a personal computer, a selective call receiver, an Internet of Things (IoT) device, a tablet computer, a laptop computer, or any other user device that is capable of sending and receiving communication signals on a wireless network. The at least one network entity 120 and 125 can be a wireless wide area network base station, can be a NodeB, can be an enhanced NodeB (eNB), can be a New Radio NodeB (gNB), such as a 5G NodeB, can be an unlicensed network base station, can be an access point, can be a base station controller, can be a network controller, can be a Transmission/Reception Point (TRP), can be a different type of network entity from each other, and/or can be any other network entity that can provide wireless access between a UE and a network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3rd Generation Partnership Project (3GPP)-based network, a satellite communications network, a high altitude platform network, the Internet, and/or other communications networks.

In operation, the UE 110 can communicate with the network 130 via at least one network entity 120 or 125. For example, the UE can send and receive control signals on a control channel and user data signals on a data channel.

Embodiments can provide for reducing overhead, such as for Type-II channel state information (CSI) via partial omission of a CSI report.

For NR Rel. 16 Type-II precoder the number of precoding matrix indicator (PMI) bits fed back from the UE in the gNB via uplink control information (UCI) can be very large (>1000 bits at large bandwidth). Such a large payload may exceed the number of bits allocated for PMI in the physical uplink shared channel (PUSCH). Thereby, a CSI omission procedure to shorten the PMI payload so that it fits within the allocated PUSCH resources would be beneficial. For NR Rel. 15 Type-II precoder, a CSI omission procedure was introduced that allowed the UE to report a part of CSI when the UCI resource allocation by the gNB is insufficient for reporting the full CSI report. In such a scenario, only a portion of the CSI report is reported, whereas the other portion is omitted from the report. The approach of removing a part of CSI report is called CSI omission. Note that by the time the UE realizes that the CSI report size exceeds the PUSCH allocation size, there is very little time for the gNB to generate a new CSI report with appropriate size, and hence it is preferred that the CSI report is structured such that omitting a given portion of it would have minimal impact on the system performance.

Embodiments can provide more efficient techniques for CSI omission to provide robust performance of Rel. 16 Type-II precoder.

Figure 2:
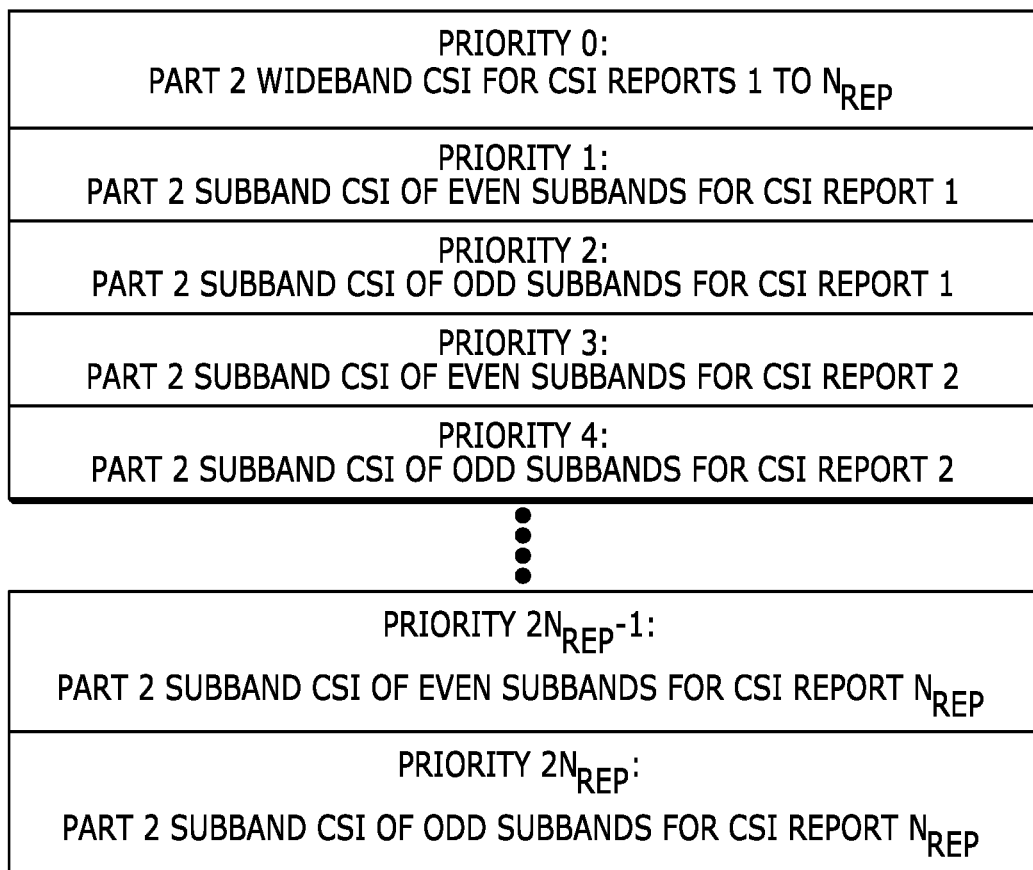
FIG. 2 is a table of an example of priority reporting levels for part 2 channel state information.

For NR Rel. 15 Type-II precoder, the sequence of bits representing the CSI report are partitioned into various parts, with the partitions being arranged in descending order of their impact on the system performance. In other words, different parameters are arranged in the order of their priorities. When the resources allocated for the CSI report are smaller than needed, the partition represented by the last sequence of bits is omitted and would not then be reported, and so on. For feedback purposes, the CSI report bits are transmitted in two parts: CSI Part 1 and CSI Part 2. CSI Part 1 includes the reported rank, channel quality indicator (CQI) and number of non-zero coefficients reported, as well as other parameters needed to calculate the number of bits in CSI Part 2. In at least some instances, it can be assumed that CSI Part 1 should not be omitted. On the other hand, CSI Part 2 includes the PMI of the Type-II CSI. The priority of CSI reports is given in the table illustrated in FIG. 2, where Priority 0 is the highest priority and Priority $2N_{Rep}$ is the lowest, as provided in 3GPP TS38.214, "Physical layer procedures for data", Rel. 15, Ver. 15.6.0. FIG. 2 illustrates a table 200 of an example of priority reporting levels for part 2 channel state information.

Hence, for a given report, CSI related to odd PMI subbands are omitted first. To enable that without complication, one can assume the magnitude/phase coefficients information is grouped into two concatenated chunks, wherein the coefficients of even PMI subbands are stacked in the first chunk whereas the coefficients corresponding to odd PMI subbands are stacked in the second chunk. In case of too large of a payload, the second chunk is not transmitted. The coefficients for odd subbands can then be somehow reconstructed from their even subbands counterpart, exploiting the frequency correlation between channels in neighboring subbands.

For Rel. 16 Type-II precoder, in addition to the legacy discrete Fourier transform (DFT)-based CSI compression of the spatial domain in Rel. 15, additional compression in the frequency domain is imposed. More specifically, each beam of the frequency-domain precoding vectors is transformed using an inverse DFT to the time domain, and the magnitude and phase values of a subset of the time-domain coefficients are selected and fed back to the gNB as part of the CSI report. Assuming the gNB is equipped with a two dimensional (2D) antenna array with $N_1$, $N_2$ antenna ports per polarization placed horizontally and vertically and communication occurs over $N_3$ PMI subbands, a PMI subband consists of a set of resource blocks, where each resource block consists of a set of subcarriers. The $2N_1N_2 \times N_3$ precoding matrix per layer takes on the form $$W = W_1 \tilde{W}_2 W_f^H, \quad (1)$$

where $W_1$ is a $2N_1N_2 \times 2L$ block-diagonal matrix ($L < N_1N_2$) with two identical diagonal blocks, i.e., $$W_1 = \begin{bmatrix} B & 0 \\ 0 & B \end{bmatrix}, \quad (2)$$

and B is an $N_1N_2 \times L$ matrix with columns drawn from a 2D oversampled DFT matrix, as follows.

$$u_m = \begin{bmatrix} 1 & e^{j\frac{2\pi m}{O_2 N_2}} & \cdots & e^{j\frac{2\pi m(N_2-1)}{O_2 N_2}} \end{bmatrix}, \quad (3)$$

$$v_{l,m} = \begin{bmatrix} u_m & e^{j\frac{2\pi l}{O_1 N_1}} u_m & \cdots & e^{j\frac{2\pi l(N_1-1)}{O_1 N_1}} u_m \end{bmatrix}^T, \quad (4)$$

$$B = [v_{l_0,m_0}\ v_{l_1,m_1}\ \cdots\ v_{l_{L-1},m_{L-1}}], \quad (5)$$

$$l_i = O_1 n_1^{(i)} + q_1,\ 0 \le n_1^{(i)} < N_1,\ 0 \le q_1 < O_1 - 1, \quad (6)$$

$$m_i = O_2 n_2^{(i)} + q_2,\ 0 \le n_2^{(i)} < N_2,\ 0 \le q_2 < O_2 - 1, \quad (7)$$

where the superscript T denotes a matrix transposition operation. Note that $O_1$, $O_2$ oversampling factors are assumed for the 2D DFT matrix from which matrix B is drawn. $W_f$ is an $N_3 \times M$ matrix ($M < N_3$) with columns selected from a critically-sampled size-$N_3$ DFT matrix, as follows $$W_f = [f_{k_0} \; f_{k_1} \; \cdots \; f_{k_{M-1}}], \; 0 \le k_i < N_3 - 1, \quad (8)$$

$$f_k = \left[1 \; e^{-j\frac{2\pi k}{N_3}} \; \cdots \; e^{-j\frac{2\pi k(N_3-1)}{N_3}}\right]^T. \quad (9)$$

Only the indices of the L selected columns of B are reported, along with the oversampling index taking on $O_1 O_2$ values. Similarly for $W_F$, only the indices of the M selected columns out of the predefined size-$N_3$ DFT matrix are reported. Hence, L, M represent the equivalent spatial and frequency dimensions after compression, respectively. Finally, the $2L \times M$ matrix $\tilde{W}_2$ represents the linear combination coefficients (LCCs) of the spatial and frequency DFT-basis vectors. Magnitude and phase values of an approximately $\beta$ fraction of the 2LM available coefficients are reported to the gNB ($\beta < 1$) as part of the CSI report. Coefficients with zero magnitude are indicated via a per-layer bitmap. Since all coefficients reported within a layer are normalized with respect to the coefficient with the largest magnitude (strongest coefficient), the relative value of that coefficient is set to unity, and no magnitude or phase information is explicitly reported for this coefficient. Only an indication of the index of the strongest coefficient per layer is reported. Hence, for a single-layer transmission, magnitude and phase values of a maximum of $\lceil 2\beta LM \rceil - 1$ coefficients (along with the indices of selected L, M DFT vectors) are reported per layer, leading to significant reduction in CSI report size, compared with reporting $2N_1 N_2 \times N_3 - 1$ coefficients' information. However, the Rel. 15 CSI omission approach cannot be adopted for Rel. 16, since the frequency domain is compressed and transformed to an altered domain, for which correlation relationships are less understood.

For ease of exposition, assume Rank-4 transmission with L=2, M=4, $\beta$=0.75, $K_{NZ}$=32. The value of M here may be layer dependent and/or rank dependent. Coefficient bitmaps per-layer are illustrated in FIG. 3. More specifically, FIG. 3 illustrates an example of coefficient bit maps 300 for rank-4 transmission with L=2, M=4, $K_{NZ}$=32.

Let $\lambda_{i,j}^{(\ell)}$, $\varphi_{i,j}^{(\ell)}$ represent the magnitude and phase values of coefficient $c_{i,j}^{(\ell)}$ in row i, column j and layer $\ell$. Hence, coefficients selected in the previous example are given by:
$\ell$=0: $c_{0,0}^{(0)}$, $c_{1,0}^{(0)}$, $c_{2,0}^{(0)}$, $c_{1,1}^{(0)}$, $c_{2,1}^{(0)}$, $c_{3,1}^{(0)}$, $c_{1,2}^{(0)}$, $c_{2,3}^{(0)}$
$\ell$=1: $c_{0,0}^{(1)}$, $c_{2,0}^{(1)}$, $c_{3,0}^{(1)}$, $c_{0,1}^{(1)}$, $c_{3,1}^{(1)}$, $c_{2,2}^{(1)}$, $c_{1,3}^{(1)}$, $c_{2,3}^{(1)}$
$\ell$=2: $c_{0,0}^{(2)}$, $c_{1,0}^{(2)}$, $c_{2,0}^{(2)}$, $c_{0,1}^{(2)}$, $c_{1,1}^{(2)}$, $c_{0,2}^{(2)}$, $c_{2,2}^{(2)}$, $c_{3,3}^{(2)}$
$\ell$=3: $c_{0,0}^{(3)}$, $c_{1,0}^{(3)}$, $c_{2,0}^{(3)}$, $c_{0,1}^{(3)}$, $c_{1,1}^{(3)}$, $c_{0,2}^{(3)}$, $c_{2,2}^{(3)}$, $c_{3,3}^{(3)}$ Without loss of generality let $c_{0,0}^{(\ell)}$ represent the strongest coefficient indicator in each layer. Thereby, we can partition Part 2 of the CSI report into S concatenated sequences of bits (groups) in descending order of priority (i.e., $G_0, G_1, G_2, \ldots, G_{S-1}$, where $G_0$ has highest priority). The sequence of bits representing Part 2 of the CSI report would then be in the form G=[$G_0 \; G_1 \; G_2 \; \ldots \; G_{S-1}$], as illustrated in FIG. 4. More specifically, FIG. 4 illustrates an example of a channel state information feedback arrangement for part 2 of a channel state information report.

Here, it is desired that these groups are structured such that the omission of the last v groups from the CSI report would not obstruct the gNB from utilizing the information reported in the first S-v groups of bits in the CSI report, without the UE being required to recalculate the CSI report after the omission decision. In this section we present a few embodiments that aim at providing CSI report structures that potentially provide good performance under partial CSI omission.

At least one approach that has been proposed implies reduction of the frequency domain (FD) basis size, e.g., reducing M=4 to M=2 so as to reduce the CSI report size. However, this may not be preferable due to the limited time for the UE to recalculate the CSI parameters (e.g., coefficient selection) after it receives knowledge of insufficient PUSCH resources.

At least a further approach that has been proposed and could be adopted for Rel. 16 CSI omission is layer-based omission. Since most of a layer's information is independently reported, e.g., magnitude/phase coefficient information and coefficient bitmap, one can omit the information related to higher layers, leading to transmission rank reduction. In other words, layer-common information is grouped into $G_\Theta$, whereas CSI information specific to layer $\ell$ is grouped into $G_{\ell+1}$. Although this may appear as the most natural approach for CSI omission, it has a few setbacks: first, reducing the rank implies reduction in number of transmitted symbols, and hence a possible reduction in spectral efficiency. Besides, the number of reported coefficients per layer are generally not equal, leading to unequal partitions of the CSI report.

It has been further proposed that the CSI report be divided into three priority groups: $G_0$, which includes all CSI information except for the coefficients' magnitude and phase information, and $G_1$, $G_2$, which include magnitude and phase information of coefficients, grouped with respect to some criterion. No detailed emphasis on this criterion is given. In addition to maintaining the transmission rank, this approach allows (in general) more flexible sizes of the partitions $G_1$, $G_2$, including having equal sizes. At least one disadvantage/obscurity of such approach would be the requirement of a predefined rule for which the gNB would detect (without ambiguity) which coefficients were omitted, otherwise updating the coefficients' bitmaps could be required. Also, in case the coefficients included within $G_2$ have significant magnitude values, the precoder performance would be degraded and the CQI values reported by UE would be misleading, causing decoding errors given the inefficient precoder performance after omission.

It has been still further proposed to perform CSI omission on a coefficient basis. More details were provided in this proposal including how to prioritize coefficients in a predefined manner. In such a case, coefficients are prioritized given their frequency domain (FD) basis index first, then their spatial domain (SD) basis index, and finally the layer index, all in descending order, i.e., layer $\ell$ has higher priority than layer $\ell+1$, similarly for FD and SD basis indices. In light of the bitmaps provided in the example above for a rank-4 transmission instance, a pictorial view of the coefficient sequencing is provided in FIG. 5 via a stacked bitmap, which illustrates how the coefficients are prioritized when parsed top-to-bottom in a column-wise manner, starting from the left column. More specifically, FIG. 5 illustrates a pictorial view 500 of a super-bit map including information from the 4 bitmaps in FIG. 2, with coefficient priority based on FD basis index, then SD basis index and finally layer index.

Given the triple-priority approach per report provided above, group $G_0$ would represent the WB parameters, whereas groups $G_1$, $G_2$ would include the coefficients' magnitude and phase information in the order provided below. The coefficients for $G_1$ are obtained by starting in position i=1, $\ell$ =0 and reading down the columns until half the total number of non-zero coefficients (excluding the strongest coefficients, represented by the underlined entries) have been assigned. The coefficients for $G_2$ are assigned by starting where assignment to $G_1$ left off. Note that both $G_1$, $G_2$ have equal sizes. Note that the strongest coefficients in each layer ($c_{0,0}^{(\ell)}$ in this example) are normalized to unity and are not included in $G_1$, $G_2$; only their locations are reported within group $G_0$.

$G_0$: WB parameters in UCI part 2
$G_1$: $c_{1,0}^{(0)}$, $c_{1,0}^{(2)}$, $c_{1,0}^{(3)}$, $c_{2,0}^{(0)}$, $c_{2,0}^{(1)}$, $c_{2,0}^{(2)}$, $c_{2,0}^{(3)}$, $c_{3,0}^{(1)}$, $c_{3,0}^{(3)}$, $c_{0,1}^{(1)}$, $c_{0,1}^{(2)}$, $c_{1,1}^{(0)}$, $c_{1,1}^{(2)}$, $c_{2,1}^{(0)}$
$G_2$: $c_{2,1}^{(3)}$, $c_{3,1}^{(0)}$, $c_{3,1}^{(1)}$, $c_{0,2}^{(2)}$, $c_{1,2}^{(0)}$, $c_{2,2}^{(1)}$, $c_{2,2}^{(2)}$, $c_{2,2}^{(3)}$, $c_{0,3}^{(3)}$, $c_{1,3}^{(1)}$, $c_{2,3}^{(0)}$, $c_{2,3}^{(1)}$, $c_{3,3}^{(2)}$, $c_{3,3}^{(3)}$ Note that due to the basis ordering of FD basis index first, then SD basis index and then layer index, coefficients with lower FD indices tend to be assigned to group $G_1$ rather than $G_2$. Although this approach addresses at least some of the ambiguity concerns of some of the above noted proposals, it is unclear whether omitting the coefficients related to the last (i.e., largest) FD basis index first would be efficient in terms of precoder performance after omission, since these coefficients may still have relatively large magnitude values, resulting in misleading CQIs being reported to gNB.

One modification to the prior approach with potential performance improvement could be changing the coefficient priority as follows: FD basis index first, then layer index and finally SD basis index. Such an approach would remove coefficients from higher layers first, and hence may help maintain the orthogonality between layers under some approaches.

FIG. 6 illustrates a pictorial view 600 of a super-bitmap including information from the 4 bitmaps in FIG. 3 organized with another example of a preselected coefficient priority. More specifically, FIG. 6 includes a pictorial view of a super-bitmap, with a coefficient priority based on FD basis index, then layer index and finally SD basis index.

In addition, more than three priority groups can be introduced to provide more flexibility in CSI omission. Without loss of generality we introduce five priority groups as follows. Group $G_0$ would represent the wide band (WB) parameters, whereas groups $G_1$, $G_2$, $G_3$ and $G_4$ would include the coefficients' magnitude and phase information (excluding those of the strongest coefficients, represented by the underlined text) in the order provided below, where all groups have equal sizes. Unless otherwise stated, we use hereafter a quintuple priority order, i.e., five priority orders. Extension to an arbitrary number of priority orders is trivial.

$G_0$: WB parameters in UCI part 2
$G_1$: $c_{1,0}^{(1)}$, $c_{2,0}^{(0)}$, $c_{2,0}^{(1)}$, $c_{3,0}^{(1)}$, $c_{1,0}^{(2)}$, $c_{2,0}^{(2)}$, $c_{1,0}^{(3)}$
$G_2$: $c_{2,0}^{(3)}$, $c_{3,0}^{(3)}$, $c_{1,1}^{(0)}$, $c_{2,1}^{(0)}$, $c_{3,1}^{(0)}$, $c_{0,1}^{(1)}$, $c_{3,1}^{(1)}$
$G_3$: $c_{0,1}^{(2)}$, $c_{1,1}^{(3)}$, $c_{2,1}^{(3)}$, $c_{1,2}^{(0)}$, $c_{2,2}^{(1)}$, $c_{0,2}^{(2)}$, $c_{2,2}^{(2)}$
$G_4$: $c_{2,2}^{(3)}$, $c_{2,3}^{(3)}$, $c_{1,3}^{(1)}$, $c_{2,3}^{(1)}$, $c_{3,3}^{(2)}$, $c_{0,3}^{(3)}$, $c_{3,3}^{(3)}$ In the present disclosure, we propose a few approaches that can be individually or jointly implemented to improve the performance of the type-II precoder under CSI omission. The proposed approaches neither require extra parameters to be reported, nor involve modifying any of the CSI report content prior to transmission via PUSCH. The objective of the following approaches is removing the coefficients associated with relatively small average magnitude, so that CSI omission would cause minimal performance loss of the Type-II precoder compared with the case without CSI omission.

Reordering of the FD Basis Indices

Our simulation results have consistently shown that the total power within the coefficients across FD basis indices is not monotonic with the FD basis index. For example, coefficients corresponding to the last FD basis index are highly likely to have higher magnitude compared with most other indices, and hence it may not be efficient to delete the coefficients corresponding to the last FD basis vector first. On the other hand, reporting the ordered FD basis indices would require additional signaling between the gNB and UE, which is also undesirable. One solution could be performing a predefined permutation of the indices of the FD basis that is known at both the gNB and UE, which matches the statistical distribution of the power across different FD basis vectors. In addition, this permutation function should be simple and robust to different transmission parameters. One example of such permutation is motivated by simulation results which have shown that the order of FD basis power values are more likely to take on an alternating order, e.g., (0; M−1; 1; M−2; 2; . . . ; $\lceil (M-1)/2 \rceil$) in descending order of power. One depiction of such column reordering would yield the super bitmap illustrated in FIG. 7. More specifically, FIG. 7 illustrates a pictorial view 700 of a super-bitmap including information from the 4 bitmaps in FIG. 3, with coefficient priority based on a reordered FD basis index, then the layer index, and finally the SD basis index.

The priority groups would then be ordered as follows:
$G_0$: WB parameters in UCI part 2
$G_1$: $c_{1,0}^{(0)}$, $c_{2,0}^{(0)}$, $c_{2,0}^{(1)}$, $c_{3,0}^{(1)}$, $c_{1,0}^{(2)}$, $c_{2,0}^{(2)}$, $c_{1,0}^{(3)}$
$G_2$: $c_{2,0}^{(3)}$, $c_{3,0}^{(3)}$, $c_{2,3}^{(0)}$, $c_{1,3}^{(1)}$, $c_{2,3}^{(1)}$, $c_{3,3}^{(2)}$, $c_{0,3}^{(3)}$
$G_3$: $c_{3,3}^{(3)}$, $c_{1,1}^{(0)}$, $c_{2,1}^{(0)}$, $c_{3,1}^{(0)}$, $c_{0,1}^{(1)}$, $c_{3,1}^{(1)}$, $c_{0,1}^{(2)}$
$G_4$: $c_{1,1}^{(2)}$, $c_{2,1}^{(3)}$, $c_{1,2}^{(0)}$, $c_{2,2}^{(1)}$, $c_{0,2}^{(2)}$, $c_{2,2}^{(2)}$, $c_{2,2}^{(3)}$ The permutation utilized above can be performed at the UE using a permutation function, as follows:

$$z = \mathrm{mod}_M((-1)^y \cdot \lceil y/2 \rceil), \quad (3)$$

where the variably y represents the original FD basis index, whereas z represents the permuted index, and $\mathrm{mod}_q(r)$ represents the modulo operation of the integer r with respect to the positive integer q. The inverse function of this operation, that is to be performed at the gNB, is as follows:

$$w = (2M-1) \cdot \upsilon + (-1)^\upsilon \cdot 2z, \text{ where } \upsilon = \lceil (2z-M+1)/2M \rceil. \quad (4)$$

Hence, given the coefficient bitmaps reported in $G_0$, and given permutation function and its corresponding inverse function, the UE can permute the coefficients (excluding the unreported magnitude/phase of the per-layer strongest coefficients, represented by the underlined font) with respect to the FD basis index and the gNB can recover their original ordering, without ambiguity. Other permutation functions that are based on the power per FD basis vector, the magnitude values of the selected coefficients within the FD basis vector, the number of coefficients per FD basis vector, or some other basis may also be used with this approach.

The UE can permute the coefficients in the CSI report with respect to the FD basis index using a fixed rule, so as to better optimize the performance under CSI omission by stacking the magnitude and phase information of coefficients with statistically larger weights first. Given the inverse permutation function, the gNB can reverse this permutation to construct the precoder without ambiguity. One example of this permutation would be transforming the conventional FD basis index ordering of [0, 1, 2, . . . , M−1] to [0, M−1, 1, M−2, 2, . . . , ⌈(M−1)/2⌉]. This can be done using the following permutation function:

$$z=\mathrm{mod}_M((-1)^y\cdot\lceil 1y/2\rceil).$$

The gNB can then reverse the permutation from [0, M−1, 1, M−2, 2, . . . , ⌈(M−1)/2⌉] to [0, 1, 2, . . . , M−1] via the corresponding inverse function:

$$w=(2M-1)\cdot\upsilon+(-1)^\upsilon\cdot 2z, \text{ where } \upsilon=\lceil(2z-M+1)/2M\rceil.$$

Other permutation functions that are based on the power per FD basis vector, the magnitude values of the selected coefficients within the FD basis vector or the number of coefficients per FD basis vector, are not precluded from this approach. The coefficient priority ordering (starting with the highest priority) would then be with respect to permuted FD basis index, then layer index and finally the SD basis index. An alternative priority ordering (starting with the highest priority) would be with respect to permuted FD basis index, then the SD basis index and finally the layer index. More generally any priority order of the permuted FD basis index, SD basis index, and layer index could be used.

Reordering of the SD Basis Indices

In the prior case, coefficients were ordered in the priority of the respective FD basis index first, then the layer index and finally the SD basis index. In this scenario, the priority is altered to SD basis index first, then the layer index and finally the FD basis index. The corresponding super bitmap would then be as illustrated in FIG. 8. More specifically, FIG. 8 illustrates a pictorial view 800 of a super-bitmap including information from the 4 bitmaps in FIG. 3, with coefficient priority based on SD basis index, then the layer index, and finally the FD basis index.

The priority groups would then be ordered as follows:
$G_0$: WB parameters in UCI part 2
$G_1$: $c_{0,1}^{(1)}$, $c_{0,1}^{(2)}$, $c_{0,2}^{(2)}$, $c_{0,3}^{(3)}$, $c_{1,0}^{(0)}$, $c_{1,1}^{(0)}$, $c_{1,2}^{(0)}$
$G_2$: $c_{1,3}^{(1)}$, $c_{1,0}^{(2)}$, $c_{1,1}^{(2)}$, $c_{1,0}^{(3)}$, $c_{2,0}^{(0)}$, $c_{2,1}^{(0)}$, $c_{2,3}^{(0)}$
$G_3$: $c_{2,0}^{(1)}$, $c_{2,2}^{(1)}$, $c_{2,3}^{(1)}$, $c_{2,0}^{(2)}$, $c_{2,2}^{(2)}$, $c_{2,0}^{(3)}$, $c_{2,1}^{(3)}$
$G_4$: $c_{2,2}^{(3)}$, $c_{3,1}^{(0)}$, $c_{3,0}^{(1)}$, $c_{3,1}^{(1)}$, $c_{3,3}^{(2)}$, $c_{3,0}^{(3)}$, $c_{3,3}^{(3)}$ Nevertheless, it has been observed (statistically) that coefficients corresponding to different SD basis vectors do not contribute uniformly to the precoder weights. However, given the method of reporting the L selected beams, only the two SD basis vectors corresponding to the beam containing the strongest coefficient on both polarizations (where the index of this beam can be determined from the per-layer strongest coefficient indicator reported in $G_0$) can be distinguished, i.e., SD basis indices i* and $\mathrm{mod}_{2L}(i*+L)$, where i* is the index of the SD basis containing the strongest coefficient. Simulations show that both SD basis vectors contribute to the highest average magnitude weights of the precoder. However, excluding the strongest coefficients (for which the magnitude and phase information is not reported, represented by underlined font), SD basis vector i* tends to have minimal sum power across the remainder of coefficients. Hence, one approach would be permuting the coefficients associated with SD basis vectors $\mathrm{mod}_{2L}(i*+L)$ and i* such that they replace with the first and last SD basis vectors, respectively, given the conventional SD basis ordering. This behavior mainly depends on the normalization approach adopted when computing the precoder at the UE. We have observed cases in which SD basis vector i* is statistically the second strongest basis vector in terms of sum power of its coefficients (excluding the unreported strongest coefficient), and hence could be swapped with the second SD basis vector, or not swapped at all, based on a predefined protocol between the UE and gNB. The super bitmap would then be as illustrated in FIG. 9. More specifically FIG. 9 illustrates a pictorial view 900 of a super-bitmap including information from the 4 bitmaps in FIG. 3, with coefficient priority based on a reordered SD basis index, then the layer index, and finally the FD basis index.

The priority groups would then be ordered as follows:
$G_0$: WB parameters in UCI part 2
$G_1$: $c_{2,0}^{(0)}$, $c_{2,1}^{(0)}$, $c_{2,3}^{(0)}$, $c_{2,0}^{(1)}$, $c_{2,2}^{(1)}$, $c_{2,3}^{(1)}$, $c_{2,0}^{(2)}$
$G_2$: $c_{2,2}^{(2)}$, $c_{2,0}^{(3)}$, $c_{2,1}^{(3)}$, $c_{2,2}^{(3)}$, $c_{1,0}^{(0)}$, $c_{1,1}^{(0)}$, $c_{1,2}^{(0)}$
$G_3$: $c_{1,3}^{(1)}$, $c_{1,0}^{(2)}$, $c_{1,1}^{(2)}$, $c_{1,0}^{(3)}$, $c_{3,1}^{(0)}$, $c_{3,0}^{(1)}$, $c_{3,1}^{(1)}$
$G_4$: $c_{3,3}^{(2)}$, $c_{3,0}^{(3)}$, $c_{3,3}^{(3)}$, $c_{0,1}^{(1)}$, $c_{0,1}^{(2)}$, $c_{0,2}^{(2)}$, $c_{0,3}^{(3)}$ The UE can permute the coefficients in the CSI report with respect to the SD basis index using a fixed rule, so as to optimize the performance under CSI omission by stacking the magnitude and phase information of coefficients with statistically larger weights. Given the fixed permutation rule, the gNB can reverse this permutation to construct the precoder without ambiguity. One example of this permutation would be swapping the order of coefficients within SD basis indices i* and $\mathrm{mod}_{2L}(i*+L)$ with the first and last SD basis indices, respectively, where i* is the index of the SD basis containing the strongest coefficient. The gNB can then reverse this permutation to construct the precoder. Other permutation functions that are based on the power per SD basis vector, the magnitude values of the selected coefficients within the SD basis vector or the number of coefficients per SD basis vector, can also be used with this approach. Using different permutation rules for different layers is not precluded. The coefficient priority ordering (starting with the highest priority) would then be with respect to permuted SD basis index, then layer index and finally the FD basis index. An alternative priority ordering (starting with the highest priority) would be with respect to permuted SD basis index, then the FD basis index and finally the layer index. More generally any priority order of the permuted SD basis index, FD basis index, and layer index could be used.

Variable Coefficient Priorities Based on Parameter Combinations

One would expect that at large M, i.e., large FD basis dimension, coefficients within some FD basis indices would have low magnitude values, and hence these coefficients should be omitted first. On the other hand, at small M, low-magnitude coefficients are more likely to be spread across weaker beams. Hence, selecting (based on the value of M) between FD basis indices and SD basis indices as the first coefficient priority when ordering the coefficient information location in the CSI report may yield better performance compared with fixed priority ordering. The criterion on which the ordering is selected can include (but is not limited to) one or more of the values in addition to M: L, β, reported rank or a function of one or more of these parameters, e.g., SD basis index has first priority for coefficient omission (similar to FIG. 7) whenever LIM>γ, where γ is a fixed constant. Otherwise, FD basis index has first priority.

Correspondingly one can select between FD basis index and SD basis index as first priority for coefficient information ordering for CSI omission, where the selection criterion is based on (but not limited to) values of L, M, β, reported rank or a function of one or more of these parameters, e.g., L/M. The FD/SD basis and layer indices may be permuted in a given fashion. More generally, the priority of possibly permuted FD, SD and layer indices is based on (but not limited to) values of L, M, β, reported rank or a function of one or more of these parameters, e.g., L/M.

Polarization-Based Coefficient Omission with Magnitude Reconstruction

Recall the precoding matrix structure in (1). Note that $\tilde{W}_2$ is represented as follows:

$$\tilde{W}_2 = \Omega \times (A \odot e^{j\phi}), \quad (5)$$

where $\Omega = \text{diag}([\omega_{Pol_i}]) \lfloor I_L$, is a size-2L diagonal matrix representing the two, reference magnitude values $\omega_{Pol_0}$, $\omega_{Pol_1}$, of both polarizations, $\text{diag}(\omega)$ is a diagonal matrix with diagonal entries being the elements of vector $\omega$, and $I_L$ is a size-L identity matrix. Note that either $\omega_{Pol_0}$, $\omega_{Pol_1}$ has unit value and hence is not reported, based on the polarization in which the strongest coefficient exists. A, $\phi$ are size 2L×M matrices representing the magnitude and phase values of the selected coefficients, respectively. The operator $e^{j\phi}$ is the element-by-element angular representation of the phases in $\phi$. The operators x, $\lfloor$, $\otimes$ represent the matrix product, element-by-element product and the Kronecker product of two matrices, respectively. When analyzing our simulation results, we have observed some correlation between the magnitude values of the two LCC coefficients associated with the same layer and FD basis index, and within the same spatial DFT vector across both polarizations, i.e., $$\lambda_{i,j}^{(\ell)}, \lambda_{\text{mod}_{2L}(i'+L),j}^{(\ell)}$$

for given layer $\ell$ and FD basis index j. One approach to reduce the impact of CSI omission is via deducing $\lambda_{i',j}^{(\ell)}$ from $$\lambda_{\text{mod}_{2L}(i'+L),j}^{(\ell)},$$

as long as $$c_{i,j}^{(\ell)}, c_{\text{mod}_{2L}(i'+L),j}^{(\ell)}$$

are non-zero coefficients. One can use this correlation to omit the magnitude values of the coefficients across the weak polarization and then the gNB would attempt to infer the omitted magnitude values of these coefficients using the magnitude values of these coefficients' counterparts at the strong polarization. Hereafter we assume 5 priority groups $G_0, \ldots, G_4$, where $G_1, \ldots, G_4$ have equal sizes. Arbitrary number of priority groups $G_0, \ldots, G_s$ can be handled in a similar manner. Also, one can generate arbitrary groups with unequal sizes, e.g., $G_0$, $G_1$, $G_2$, $G_3$, where $\text{size}(G_2) = \text{size}(G_3) = 0.5\ \text{size}(G_1)$. Thereby, magnitude and phase information for the non-zero coefficients (excluding the strongest coefficient) within the same polarization are decoupled. In other words, coefficient priority would now be based on a permutation of the polarization index, coefficient information type (magnitude vs. phase information), FD basis index, SD basis index and layer index. Note that in such scenario the sizes of $G_1, \ldots, G_4$ would depend on the phase quantization resolution $l_p \in \{3,4\}$ bits (coefficient magnitude resolution is fixed at $l_m = 3$ bits).

Figure 10:
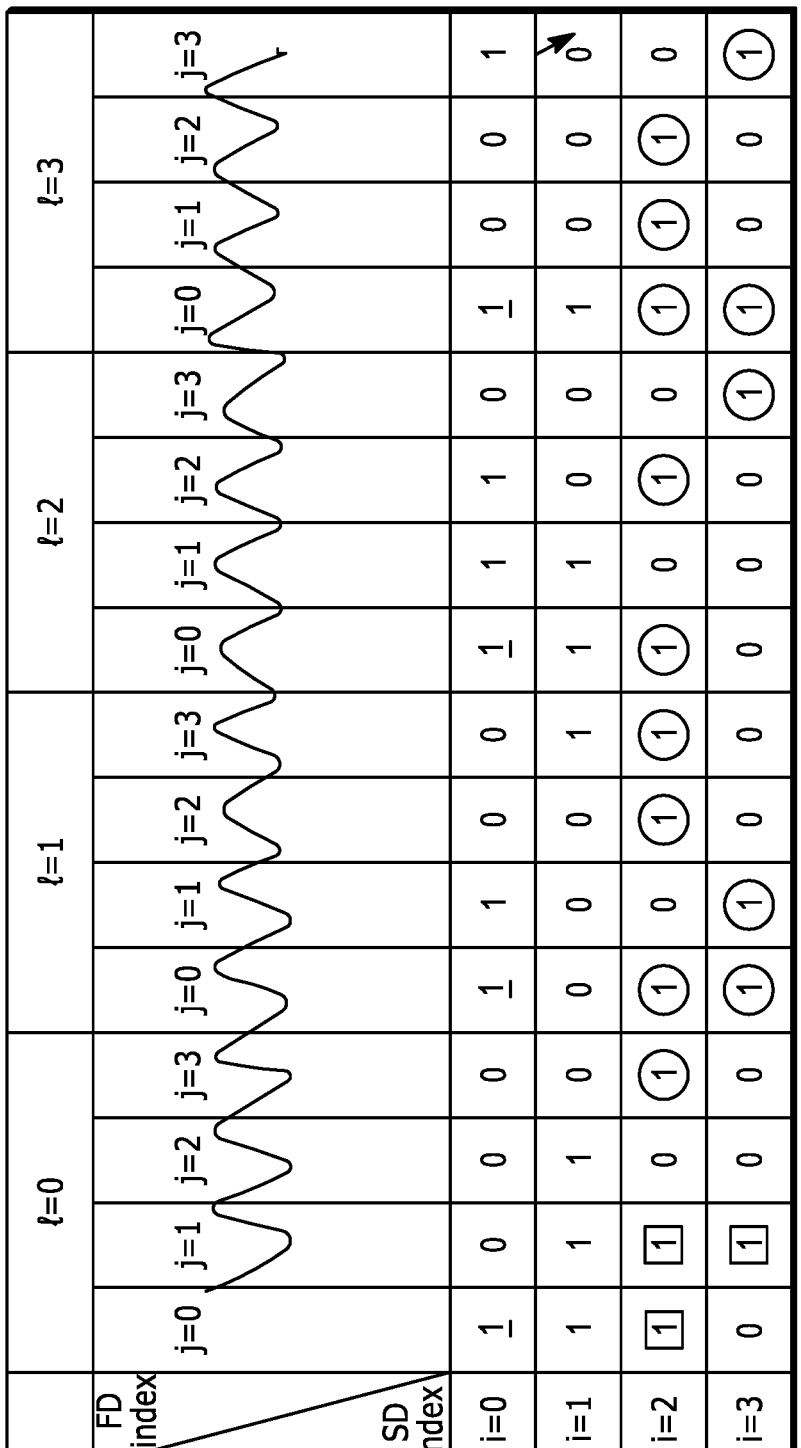
FIG. 10 is a pictorial view of a super-bitmap including information from the 4 bitmaps in FIG. 3, organized with a preselected coefficient priority, that includes a coefficient priority based on polarization.

In the two examples corresponding to FIG. 10, the priority is ordered by polarization, phase/magnitude information, FD basis index, layer index and then SD basis index. Different phase quantization resolution is used in both examples.

FIG. 10 illustrates a pictorial view 1000 of a super-bitmap including information from the 4 bitmaps in FIG. 3, organized with a preselected coefficient priority, that includes a coefficient priority based on polarization, as well as FD basis index, layer index and then SD basis index. The priority ordering can also be depicted for the first polarization by the arrow above.

In example 1: $l_p = 3$ bits.

The priority groups would then be listed as follows:

$G_0$: WB parameters in UCI part 2

$G_1$: $\varphi_{1,0}^{(0)}$, $\varphi_{1,1}^{(0)}$, $\varphi_{0,1}^{(1)}$, $\varphi_{1,3}^{(1)}$, $\varphi_{1,0}^{(2)}$, $\varphi_{0,1}^{(2)}$, $\varphi_{1,1}^{(2)}$, $\varphi_{0,2}^{(2)}$, $\varphi_{1,0}^{(3)}$, $\varphi_{0,3}^{(3)}$, $\lambda_{1,0}^{(0)}$, $\lambda_{1,1}^{(0)}$, $\lambda_{1,2}^{(0)}$ $G_2$: $\lambda_{0,1}^{(1)}$, $\lambda_{1,3}^{(3)}$, $\lambda_{1,0}^{(2)}$, $\lambda_{0,1}^{(2)}$, $\lambda_{1,1}^{(2)}$, $\lambda_{0,2}^{(2)}$, $\lambda_{1,0}^{(3)}$, $\lambda_{0,3}^{(3)}$, $\varphi_{2,0}^{(0)}$, $\varphi_{2,1}^{(0)}$, $\varphi_{3,1}^{(0)}$, $\varphi_{2,3}^{(0)}$, $\varphi_{2,0}^{(1)}$, $\varphi_{3,0}^{(1)}$ $G_3$: $\varphi_{3,1}^{(1)}$, $\varphi_{2,2}^{(1)}$, $\varphi_{2,3}^{(1)}$, $\varphi_{2,0}^{(2)}$, $\varphi_{3,3}^{(2)}$, $\varphi_{2,0}^{(3)}$, $\varphi_{3,0}^{(3)}$, $\varphi_{2,1}^{(3)}$, $\varphi_{3,3}^{(3)}$, $\varphi_{3,3}^{(3)}$, $\lambda_{2,0}^{(0)}$, $\lambda_{2,1}^{(0)}$, $\lambda_{3,1}^{(0)}$ $G_4$: $\lambda_{2,3}^{(0)}$, $\lambda_{2,0}^{(1)}$, $\lambda_{3,0}^{(1)}$, $\lambda_{3,1}^{(1)}$, $\lambda_{2,2}^{(1)}$, $\lambda_{2,3}^{(1)}$, $\lambda_{2,0}^{(2)}$, $\lambda_{,2}^{(2)}$, $\lambda_{3,3}^{(2)}$, $\lambda_{2,0}^{(3)}$, $\lambda_{3,0}^{(3)}$, $\lambda_{2,1}^{(3)}$, $\lambda_{2,1}^{(3)}$, $\lambda_{2,3}^{(3)}$, $\lambda_{3,3}^{(3)}$ In at least some instances, we can assume here that only bits corresponding to $G_4$ sequence are omitted. Looking into the second (weak) polarization (represented by SD basis indices i=2, 3), one realizes there can be three different categories of non-zero coefficients within this polarization:

1. Coefficients with magnitude and phase information included in any of the priority groups preceding $G_4$ (represented by the "1" symbols with a square around it in FIG. 10) and hence fully captured in the CSI report to gNB.
2. Coefficients with neither magnitude nor phase information included prior to $G_4$ (not an applicable case in FIG. 10) and hence omitted (reconstructing the coefficient information may not be possible).
3. Coefficients with phase information only captured prior to $G_4$ (represented by the "1" symbol with a circle around it in FIG. 10) but magnitude information omitted as part of $G_4$. The gNB can then generate an estimate value for the magnitude values along with the reported phase values so as to approximate the coefficient values.

One example of a straightforward method of approximating the coefficient magnitude in the latter case would be reusing the differential magnitude of the coefficient within the same layer, FD basis index and across polarization, i.e., setting $$\lambda_{i,j}^{(\ell)} = \lambda_{\text{mod}_{2L}(i'+L),j}^{(\ell)},$$

as long as both $c_{i',j}^{(\ell)}$ and $$\lambda_{\text{mod}_{2L}(i'+L),j}^{(\ell)}$$

are selected coefficients with non-zero magnitude. Alternatively, a fixed magnitude value can be used.

In Example 2: $l_p = 4$ bits.

Under this case, priority groups would be listed as follows $G_0$: WB parameters in UCI part 2

$G_1$: $\varphi_{1,0}^{(0)}$, $\varphi_{1,1}^{(0)}$, $\varphi_{1,2}^{(0)}$, $\varphi_{0,1}^{(1)}$, $\varphi_{1,3}^{(1)}$, $\varphi_{1,0}^{(2)}$, $\varphi_{0,1}^{(2)}$, $\varphi_{1,1}^{(2)}$, $\varphi_{0,2}^{(2)}$, $\varphi_{1,0}^{(3)}$, $\varphi_{0,3}^{(3)}$, $\lambda_{1,0}^{(0)}$ Erased (if $G_2$, $G_3$ and $G_4$ are omitted): $\lambda_{1,1}^{(0)}$ $G_2$: $\lambda_{1,2}^{(0)}$, $\lambda_{0,1}^{(1)}$, $\lambda_{1,3}^{(1)}$, $\lambda_{1,0}^{(2)}$, $\lambda_{0,1}^{(2)}$, $\lambda_{1,1}^{(2)}$, $\lambda_{0,2}^{(2)}$, $\lambda_{1,0}^{(3)}$, $\lambda_{0,3}^{(3)}$, $\varphi_{2,0}^{(0)}$, $\varphi_{2,1}^{(0)}$, $\varphi_{3,1}^{(0)}$, $\varphi_{2,3}^{(0)}$, $\varphi_{2,0}^{(1)}$ Erased (if $G_3$ and $G_4$ only are omitted): $\varphi_{3,0}^{(1)}$ $G_3$: $\varphi_{3,1}^{(1)}$, $\varphi_{2,2}^{(1)}$, $\varphi_{2,3}^{(1)}$, $\varphi_{2,0}^{(2)}$, $\varphi_{2,2}^{(2)}$, $\varphi_{3,3}^{(2)}$, $\varphi_{2,0}^{(3)}$, $\varphi_{3,0}^{(3)}$, $\varphi_{2,1}^{(3)}$, $\varphi_{2,2}^{(3)}$, $\varphi_{3,3}^{(3)}$ Erased (if $G_4$ only is omitted): $\lambda_{2,0}^{(0)}$ $G_4$: $\lambda_{2,1}^{(0)}$, $\lambda_{3,1}^{(0)}$, $\lambda_{2,3}^{(0)}$, $\lambda_{2,0}^{(1)}$, $\lambda_{3,0}^{(1)}$, $\lambda_{3,1}^{(1)}$, $\lambda_{2,2}^{(1)}$, $\lambda_{2,3}^{(1)}$, $\lambda_{2,0}^{(2)}$, $\lambda_{2,2}^{(2)}$, $\lambda_{3,3}^{(2)}$, $\lambda_{2,0}^{(3)}$, $\lambda_{3,0}^{(3)}$, $\lambda_{2,1}^{(3)}$, $\lambda_{2,2}^{(3)}$, $\lambda_{3,3}^{(3)}$ Note that under the assumption of equal sizes of $G_1, \ldots, G_4$, it is possible that the magnitude/phase information bits of a coefficient falls at the boundary of two consecutive priority groups, and hence would be deemed useless if the group at its boundary is omitted. For example, if only $G_4$ would be omitted, one bit of $\lambda_{2,0}^{(0)}$ would be erased, and hence this magnitude value cannot be realized at gNB. Same applies to $\varphi_{3,0}^{(1)}$ if both $G_3$, $G_4$ are omitted.

Also, note that this approach can be integrated with the prior claims, in the sense that the coefficient information can be ordered with respect to a permuted FD basis index and/or permuted SD basis index. In the latter case, the first L SD beam indices after permutation would constitute an equivalent polarization, and would be treated in a manner similar to the first/second L SD beam indices (corresponding to both polarizations) in the two examples above.

The UE can decompose the coefficient information into magnitude and phase information, and order the coefficient information in the CSI report with respect to (a subset of) the following parameters: Polarization index, coefficient information type (differential phase/magnitude information), FD basis index, SD basis index and layer index. The FD/SD basis and layer indices may be permuted in a given fashion. Given the fixed permutation rules of theses indices, the gNB can reverse this permutation to construct the precoder without ambiguity. Under the permutation of the SD basis indices, the first/last L SD basis indices after permutation are regarded as SD basis indices associated with the same polarization, as far as the aforementioned scheme is concerned. Under some scenarios, the gNB can infer the magnitude values of the coefficients for which phase information only was retained. Methods of such inference can be based on a function of the reported magnitude values associated with other coefficients, or even use a fixed value.

Coefficient Omission Based on Bit Level Classification

For ease of exposition, in the sequel we refer to the SD basis index and polarization index including the strongest coefficient as the main beam and strong polarization, respectively. We also assume a single-layer transmission; extension to multiple layers is discussed in the sequel. Including only the bitmap bits and the coefficient quantization bits, there are $2LM+(K_{NZ}-1)\cdot(l_m+l_p)$ bits reported given a single-layer transmission. The value of M here may be layer dependent and/or rank dependent. Since the first coefficient of the main beam is generally always non-zero, there is no need of a bitmap bit for that coefficient. This will make total of $2LM-1+(2\beta LM-1)\cdot(l_m+l_p)$ bits. In this section, we propose various permutations of these bits (including bitmap bits) that provide good performance under CSI omission. The permuted sequence of bits constitute multiple groups of bits, where the last subset of groups may be omitted prior to being signaled from the UE to the gNB. Most of the methods listed above are also permutations in a certain sense, however, they tend to keep all of a coefficient information bits together and did not envision cases where it may be better to decouple a coefficients' bits in such a way so that part of the bits may be reported whereas the other part is not reported due to partial CSI omission. The polarization-based coefficient omission in the previous sub-section suggests that decoupling the magnitude and phase information could be useful. However, the following proposal suggests that fragmenting the coefficient information in less conventional ways can provide further gain.

The objective of this approach is permuting the CSI Part 2 bits so that the bits which have a significant impact on performance are placed in the beginning of the sequence whereas the bits with less impact are placed in the end. This permutation can be dynamic or adaptive in the sense that the next bit in the permuted sequence may depend on the value of the previous bit. In addition to being useful for CSI omission, this approach can also be applied when different parts of the CSI report are coded using different rate, i.e., unequal error protection of CSI feedback bits. The bits in the beginning part could be encoded with a higher error protection code whereas the bits in the end part are encoded with lower error protection code. CSI omission can be said to be a special case of unequal error protection were the end part bits are erased with probability one.

In the subsequent description of this proposal, we will be using the following notations. The $K_{NZ}$ non-zero coefficients $c_k$ have magnitude and phase information bits coded as $\{\lambda_{l_m-1}^k \lambda_{l_m-2}^k, \ldots, \lambda_0^k\}$ and $\{\varphi_{l_p-1}^k \varphi_{l_p-2}^k, \ldots, \varphi_0^k\}$, respectively. The magnitude values are encoded such that the larger magnitude values are encoded with larger values in the binary domain, and vice versa, where $\lambda_{l_m-1}^k$ is the highest order magnitude bit and $\lambda_0^k$ is the lowest order magnitude bit. The magnitude quantization levels are uniform in a logarithmic scale.

In one of the embodiments of the proposed scheme, all the 2LM bitmap (or 2LM−1) bits are placed in the beginning. The bitmaps bits are followed by the highest order magnitude bit $\lambda_{l_m-1}^k$ of all non-zero coefficients, excluding the strongest coefficient. This is followed by the remaining magnitude and phase bits for coefficients which have a non-zero highest order magnitude bit, i.e., $\lambda_{l_m-1}^k=1$. This is followed by the remaining magnitude bits and phase bits of coefficients for which $\lambda_{l_m-1}^k=0$. This arrangement is shown in FIG. 11. More specifically, FIG. 11 illustrates a CSI feedback arrangement 1100 for part 2 of a CSI report with coefficient information permutation based on most significant magnitude bit. In the figure the $p^{th}$ and $q^{th}$ coefficients are shown to have $\lambda_{l_m-1}^p=\lambda_{l_m-1}^q=1$ while the $r^{th}$ coefficient has $\lambda_{l_m-1}^r=0$.

Note that reversing the ordering of the remaining magnitude and phase information bits per coefficient in groups $G_3$, $G_4$, is not precluded, i.e., $\{\varphi_{l_p-1}^k, \ldots, \varphi_0^k \lambda_{l_m-2}^k, \ldots, \lambda_0^k\}$ for any coefficient $c_k$. Groups $G_0, \ldots, G_4$ may not have the same size. The bits in the partitions associated with the earlier groupings are believed to be more critical for the performance of the Type-II precoder compared with those in a later grouping, and hence omitting the bits in the latter partition for partial CSI omission purposes may have minimal impact on performance. Note that even if groups $G_3$ or $G_4$ are partially omitted the gNB would still be able to reconstruct all coefficients whose magnitude and phase bits are fully reported within the non-omitted part.

In another embodiment, bits in $G_2$ may represent the higher order bits of coefficients belonging to the strong polarization (presumably polarization index 0). $G_2$ may include higher order bits from the weaker polarization only if the common gain factor of the weaker polarization is greater than a predefined threshold (for example >−3 dB). This will make the coefficient ordering across groups of FIG.

10 dependent on the weaker polarization (presumably polarization index 1) common gain factor ($\omega_{Pol_1}$, assuming polarization index 1 is the weaker polarization).

In another embodiment, groups $G_0$, $G_1$, $G_2$ and $G_3$ in FIG. 11 remain as is, yet it may turn out that the number of bits included till the end of group $G_3$ are lower than a threshold value that is either predefined or parameterized by a function of one or more parameters signaled by the gNB to the UE. Thereby group $G_4$ can be further decomposed into three subgroups $G_4'$ and $G_5'$ and $G_6'$ as shown in FIG. 12, where $G_4'$ includes the second highest order magnitude bits of the remaining coefficients $\lambda_{l_{m-2}}^j$ that are not included in group $G_3$, i.e., coefficient with $\lambda_{l_{m-1}}^j=0$. Subgroup $G_5'$ would then include the remaining magnitude and phase information bits of coefficients for which $\lambda_{l_{m-2}}^j=1$ and $\lambda_{l_{m-1}}^j=0$ in subgroup $G_4'$. Finally subgroup $G_5'$ would include the remainder of magnitude and phase information bits for which $\lambda_{l_{m-1}}^j=\lambda_{l_{m-2}}^j=0$. If the common gain factor for the weak polarization is within a certain range (e.g., $-3$ dB$\geq\omega_{Pol_1}\geq-9$ dB) then the highest order bits of the weaker polarization may be included in subgroup $G_4'$. More specifically FIG. 12 illustrates a CSI feedback arrangement 1200 for part 2 of a CSI report with coefficient information permutation based on the two most significant magnitude bits.

In another embodiment instead of including all the highest order magnitude bits for all the non-zero coefficients in group $G_2$, one can merge bit groups $G_2$ and $G_3$ in FIG. 11 as follows: after adding the highest order magnitude bit $\lambda_{l_{m-1}}^k$ for a certain non-zero coefficient, if that bit is 1 then the next set of bits are the remaining magnitude and phase bits of that coefficient. However, if the highest order magnitude bit of a coefficient is 0 then proceed to the highest order magnitude of the following non-zero coefficient. Once all the highest order bits are listed (including the remaining bits for coefficients with $\lambda_{l_{m-1}}^k=1$), we proceed with a similar approach with the next higher order magnitude bits.

In yet another embodiment, we can further merge bit groups $G_1$, $G_2$ and $G_3$ in FIG. 11 as follows: instead of listing all the bitmaps bits successively, one can adopt the approach described in the previous paragraph for the highest order magnitude bit with bitmaps bits. Just after adding a bitmap bit, if the bit value is 1 we then add the corresponding highest order magnitude bit $\lambda_{l_{m-1}}^k$ of this coefficient, and if $\lambda_{l_{m-1}}^k=1$ we add the remaining magnitude and phase bits of that coefficient, otherwise proceed to the next bit map bit and so on. Once all coefficients with $\lambda_{l_{m-1}}^k=1$ have been added, add the coefficients with $\lambda_{l_{m-1}}^k=0$ in the same order that their highest order magnitude bits (which are equal to 0) were added. We may even place the bitmap bits of the weaker polarization in the omission part if the weaker polarization common gain ($\omega_{Pol_1}$, assuming polarization index 1 is the weaker polarization) is very low.

When the reported rank is greater than 1, the approach we described above can be used for a single layer at a time, i.e., use the above approach for $1^{st}$ layer then $2^{nd}$ layer and so on. That is, place the bits of first layer as shown in FIG. 11 then place bits of second layer using FIG. 11 (or similarly for the approach in FIG. 12 as well as other approaches described in this subsection). Variations of priority orders between (possibly permuted) layer, SD basis and FD basis indices are not excluded. Note that in such case it may be beneficial to list the bitmap bits of all the layers prior to listing any of the coefficients' magnitude/phase bits so that it is easy to determine the number of non-zero coefficients in each layer.

To summarize, at least one of the benefits of the proposed approach can be as follows. Since the quantization levels of the coefficient magnitude values are spaced uniformly in logarithmic scale, and assuming the magnitude mapping of coefficients is pursued such that the bit-sequence representation is in ascending order of the coefficient magnitude values, it can be shown in general that omitting a coefficient with most significant bit of zero results in a more efficient precoder, compared with omitting coefficients at random. In that sense the proposed approach tends to avoid the omission of coefficients with large magnitude values during CSI omission.

Assuming that the large coefficient magnitude values are assigned by larger bit-sequence values in the binary domain, and vice versa, the UE can decompose the coefficient information into magnitude and phase information, and further decompose the magnitude information bits into highest order magnitude, second-highest order magnitude, and so on. The UE can then order the coefficient information in the CSI report with respect to (a subset of) the following parameters: Polarization index, information type (differential phase/magnitude information), FD basis index, SD basis index, layer index, most significant bit in magnitude representation, second most significant bit and so on. The FD/SD basis and layer indices may be permuted in a given fashion. Given the fixed permutation rules of theses indices, the gNB can reverse this permutation to construct the precoder without ambiguity. The UE can list the magnitude/phase information bits (fully or partially) of a given coefficient based on the value of the coefficient bitmap bit. Similarly, the value of the most significant bit (or second most, and so on) of the coefficient magnitude can determine whether the remainder of magnitude/phase information bits are listed instantly or later in Part 2 of the CSI report.

Figure 13:
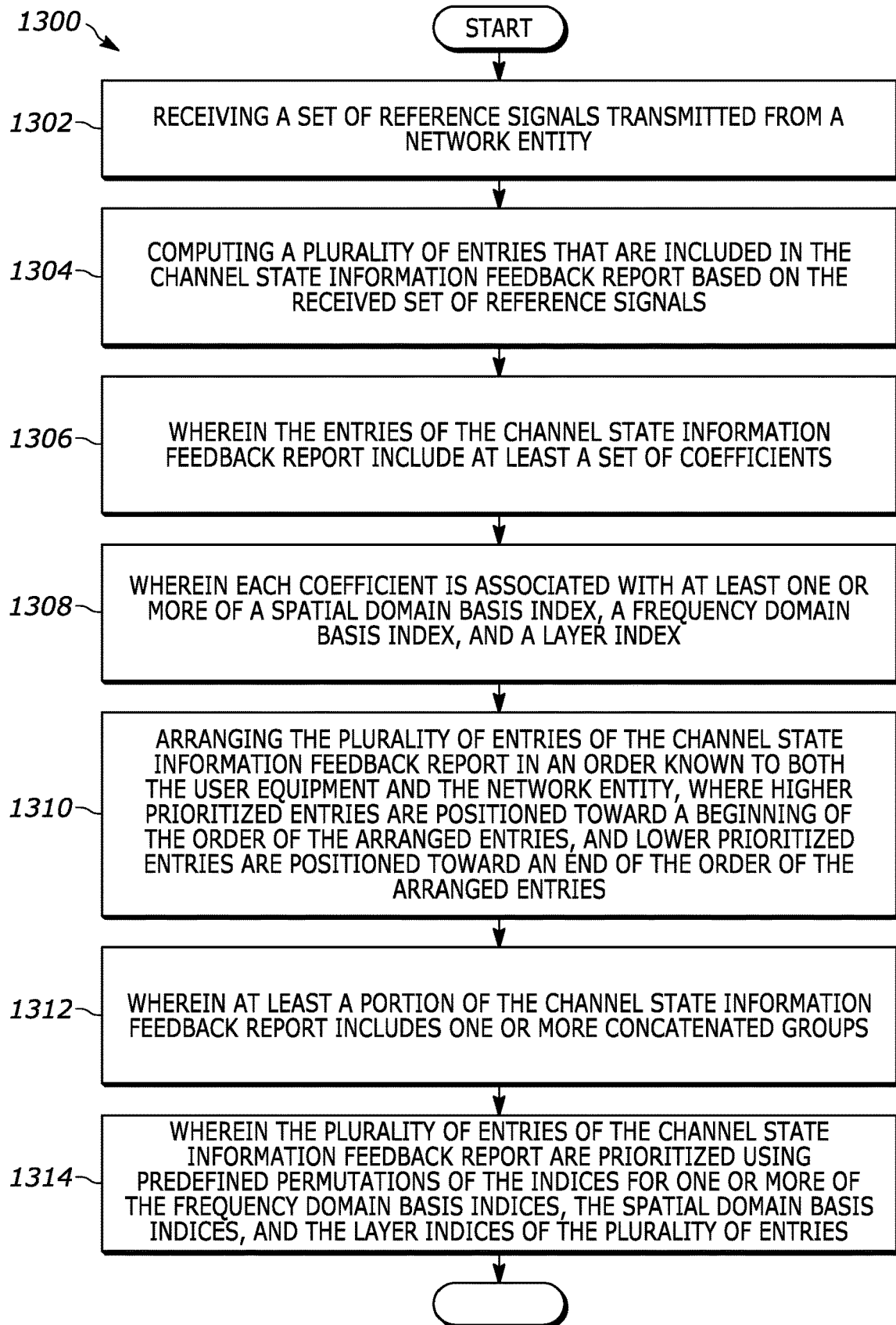
FIG. 13 is a flow diagram in a user equipment for generating a channel state information report, which prioritizes the location of the entries in the report based upon one or more indices.

FIG. 13 illustrates a flow diagram 1300 in a user equipment for generating a channel state information report, which prioritizes the location of the entries in the report based upon one or more indices. The method includes receiving 1302 a set of reference signals transmitted from a network entity. A plurality of entries that are included in the channel state information feedback report based on the received set of reference signals are computed 1304, where the entries of the channel state information feedback report include at least a set of coefficients 1306. Each coefficient is associated with at least one or more of a spatial domain basis index, a frequency domain basis index, and a layer index 1308. The plurality of entries of the channel state information feedback report are arranged 1310 in an order known to both the user equipment and the network entity, where higher prioritized entries are positioned toward a beginning of the order of the arranged entries, and lower prioritized entries are positioned toward an end of the order of the arranged entries. At least a portion of the channel state information feedback report includes one or more concatenated groups 1312. The plurality of entries of the channel state information feedback report are prioritized using predefined permutations of the indices for one or more of the frequency domain basis indices, the spatial domain basis indices, and the layer indices of the plurality of entries 1314.

In some instances, the predefined permutations which are used to prioritize the plurality of entries based upon the one or more of the frequency domain basis index, the spatial domain basis index, and the layer index, can include a priority ordering that is based on the order of a higher priority of the frequency domain basis indices, then the spatial domain basis indices, and then the layer indices.

In some instances, the predefined permutation can map the frequency domain basis indices from 0, M−1, 1, M−2, 2, . . . , [(M−1)/2] to 0, 1, 2, . . . , M−1, respectively, where M represents a total number of frequency domain basis indices, and an output of the ceiling operator ⌈q⌉ is a smallest integer value greater than or equal to a real value q. In some of these instances, the mapping of the frequency domain basis indices can be achieved using the following predefined permutation function $w=(2M-1)\cdot\upsilon+(-1)^{\upsilon}\cdot 2z$, where $\upsilon=\lceil(2z-M+1)/2M\rceil$, z represents the frequency domain basis index prior to permutation, and w represents the frequency domain basis index after permutation. Further, using the following predefined permutation function can include the user equipment arranging the plurality of entries in accordance with a function including: $z=\mathrm{mod}_M((-1)^y\cdot\lceil y/2\rceil)$, where y represents an original frequency domain basis index, where z represents a permuted frequency domain index, and $\mathrm{mod}_q(r)$ represents a modulo operation of an integer r with respect to a positive integer q.

In some instances, the predefined permutations which are used to prioritize the plurality of entries based upon the one or more of the frequency domain basis index, the spatial domain basis index, and the layer index, can include a priority ordering that is based on the order of a higher priority of the spatial domain basis indices, then the frequency domain basis indices, and then the layer indices.

In some instances, a predefined permutation function of the spatial domain basis indices can swap the spatial domain basis indices i* and $\mathrm{mod}_{2L}(i^*+L)$ with first and last spatial domain basis indices, respectively, where i* is an index of the spatial domain basis containing a strongest coefficient, L represents a total number of spatial domain basis indices, and $\mathrm{mod}_q(r)$ represents a modulo operation of an integer r with respect to a positive integer q.

In some instances, the predefined permutations which are used to prioritize the plurality of entries can be based upon the one or more of the frequency domain basis index, the spatial domain basis index, and the layer index, wherein a particular priority ordering is selected based upon a set of predefined criteria, which can be determined from a set of channel state information related parameters. In some of these instances, channel state information feedback report related parameters from which the particular priority ordering can be selected can include one or more of M, L, or β, where M represents the total number of frequency domain basis indices, L represents the total number of spatial domain basis indices, and β represents the fraction of the reported coefficients with respect to the total number of available coefficients. Further, the channel state information feedback report related parameters from which the particular priority ordering is selected can include M and L, where L/M being greater than a predefined threshold results in a priority ordering that is based initially on the spatial domain basis index then the frequency domain basis index, and where L/M being less than the predefined threshold results in a priority ordering that is based on the order of a higher priority of the frequency domain basis indices then the spatial domain basis indices.

In some instances, a corresponding coefficient value of each of the coefficients of the channel state information feedback report can be decomposed into a plurality of coefficient indicator types that are separately reported in the channel state information feedback report, including one or more of a magnitude indicator, a phase indicator, a reference magnitude indicator, and wherein the reference magnitude indicator is comprised of two reference magnitude information value corresponding to each layer index, where each value is common for the coefficients corresponding to one polarization of a set of two polarizations. In some of these instances, the coefficients associated with any one of the spatial domain basis indices i=0, 1, . . . , L−1 can correspond to the first polarization of the set of two polarizations, and wherein the coefficients associated with any one of the spatial domain basis indices i=L, L+1, . . . , 2L−1 corresponds to the second polarization of the set of two polarizations. Further, the predefined permutations which are used to arrange the plurality of entries can be based upon the one or more of the frequency domain basis indices, the spatial domain basis indices, the layer indices, polarization indices, and coefficient indicator types. Still further, the priority ordering of the entries of the channel state information feedback report can be based on the order of the higher priority of the polarization indices, then the coefficient indicator types, then the frequency domain basis indices, then the spatial domain basis indices, and then the layer indices.

In some instances, the entries of the channel state information feedback report include a set of bitmap entries, wherein each bitmap entry can be associated with the one or more of the spatial domain basis index, the frequency domain basis index, and the layer index.

In some instances, when a size of the channel state information feedback report exceeds an amount of resources made available for communicating the channel state information feedback report to the network entity, the user equipment can transmit a truncated version of the channel state information feedback report, where the entries omitted from the truncated version of the channel state information feedback report are the entries corresponding to a last one or more of the one or more groups of the channel state information feedback report.

Figure 14:
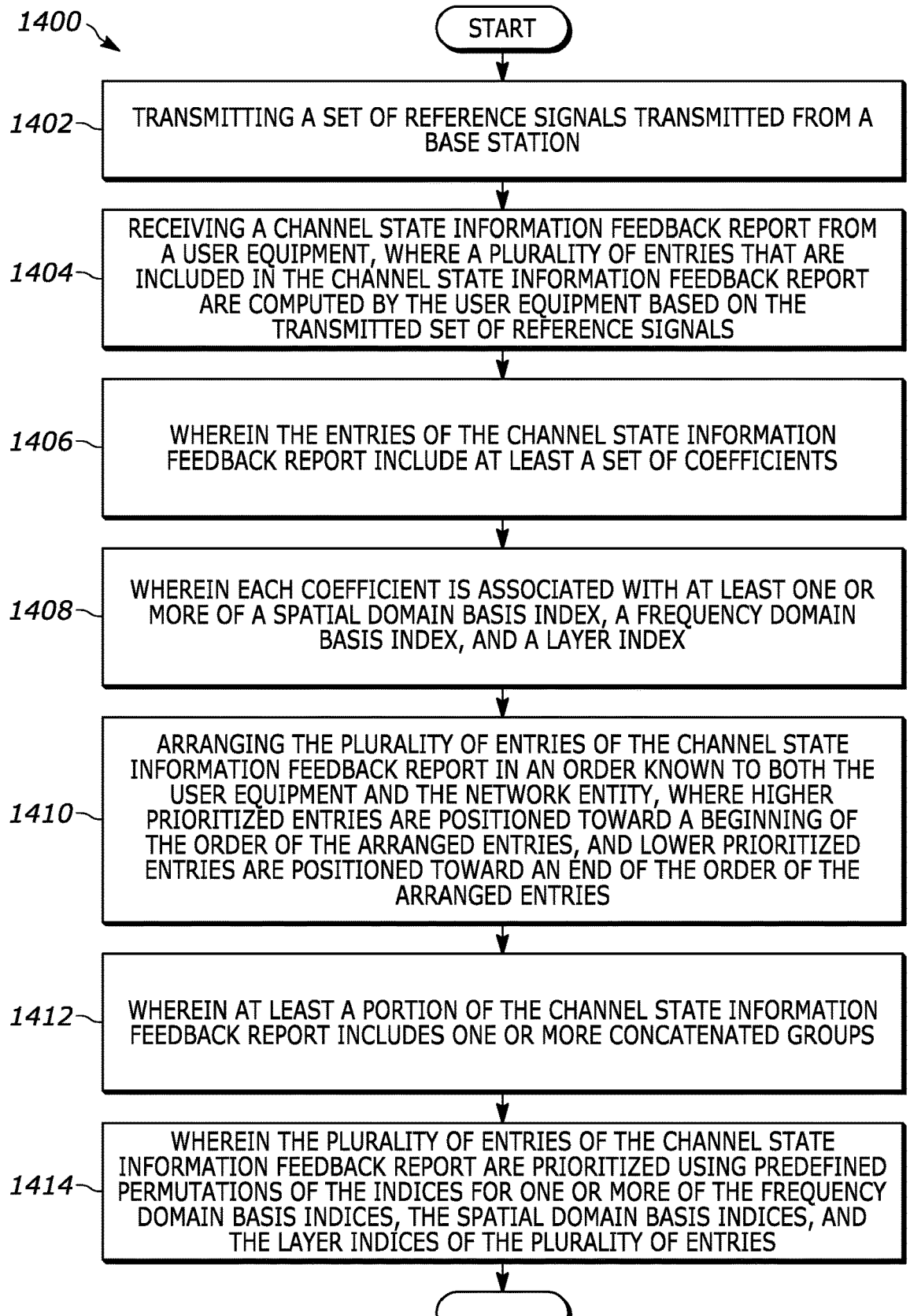
FIG. 14 is a flow diagram in a network entity for generating a channel state information report, which prioritizes the location of the entries in the report based upon the value of one or more indices.

FIG. 14 illustrates a flow diagram 1400 in a network entity for generating a channel state information report, which prioritizes the location of the entries in the report based upon the value of one or more indices. The method includes transmitting 1402 a set of reference signals transmitted from a base station, and receiving 1404 a channel state information feedback report from a user equipment, where a plurality of entries that are included in the channel state information feedback report are computed by the user equipment based on the transmitted set of reference signals, where the entries of the channel state information feedback report include at least a set of coefficients 1406. Each coefficient is associated with at least one or more of a spatial domain basis index, a frequency domain basis index, and a layer index 1408. The plurality of entries of the channel state information feedback report are arranged 1410 in an order known to both the user equipment and the network entity, where higher prioritized entries are positioned toward a beginning of the order of the arranged entries, and lower prioritized entries are positioned toward an end of the order of the arranged entries. At least a portion of the channel state information feedback report includes one or more concatenated groups 1412. The plurality of entries of the channel state information feedback report are prioritized using predefined permutations of the indices for one or more of the frequency domain basis indices, the spatial domain basis indices, and the layer indices of the plurality of entries 1414.

Figure 15:
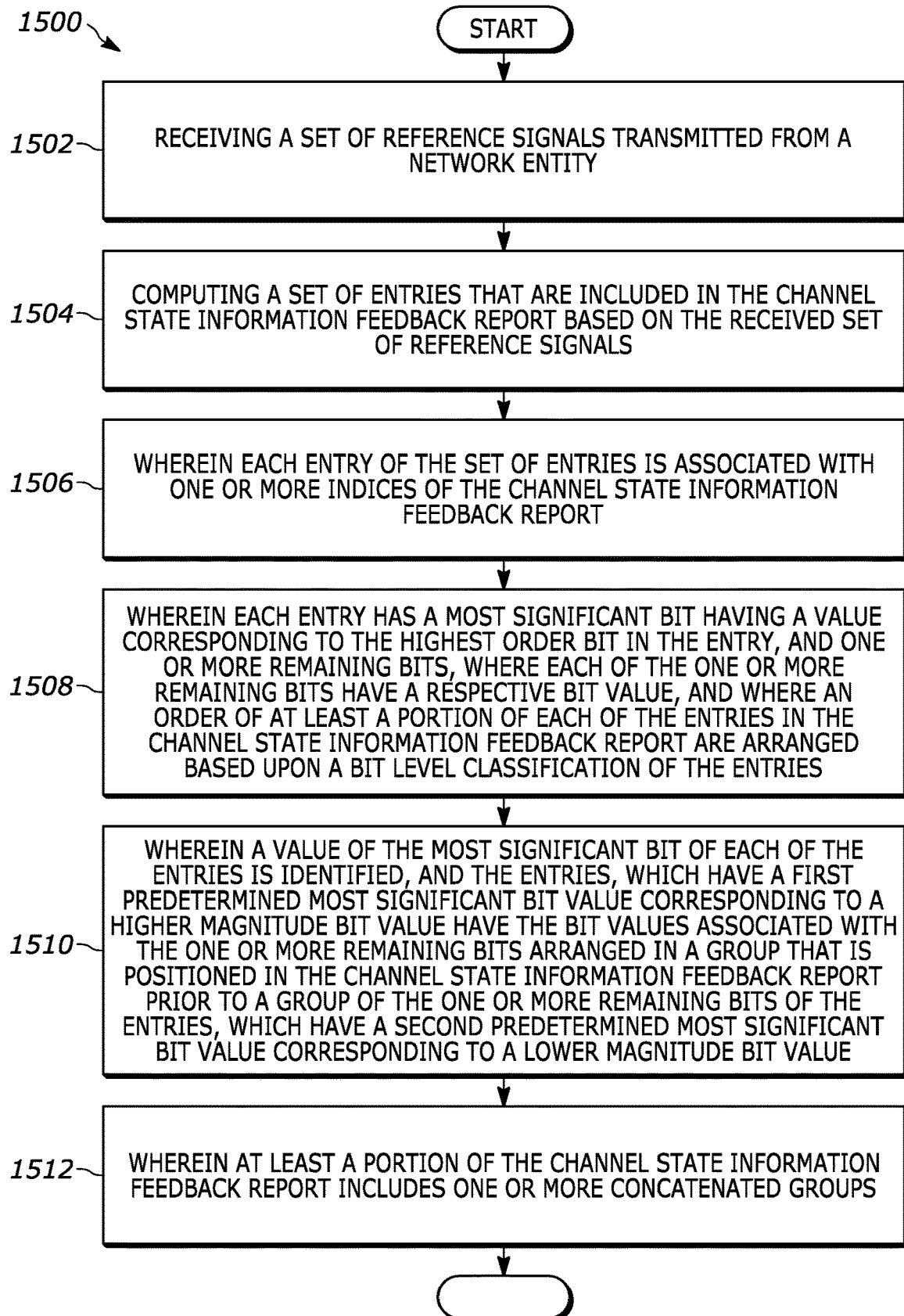
FIG. 15 is a flow diagram in a user equipment for generating a channel state information report, which prioritized the location of the entries in the report based upon the value of one or more entry bits.

FIG. 15 illustrates a flow diagram 1500 in a user equipment for generating a channel state information report, which prioritized the location of the entries in the report based upon the value of one or more entry bits. The method includes receiving 1502 a set of reference signals transmitted from a network entity, and computing 1504 a set of entries that are included in the channel state information feedback report based on the received set of reference signals, where each entry of the set of entries is associated with one or more indices of the channel state information feedback report 1506. Each entry has a most significant bit having a value corresponding to the highest order bit in the entry, and one or more remaining bits, where each of the one or more remaining bits have a respective bit value, and where an order of at least a portion of each of the entries in the channel state information feedback report are arranged based upon a bit level classification of the entries 1508. A value of the most significant bit of each of the entries is identified, and the entries, which have a first predetermined most significant bit value corresponding to a higher magnitude bit value have the bit values associated with the one or more remaining bits arranged in a group that is positioned in the channel state information feedback report prior to a group of the one or more remaining bits of the entries, which have a second predetermined most significant bit value corresponding to a lower magnitude bit value 1510. At least a portion of the channel state information feedback report includes one or more concatenated groups 1512.

In some instances, the bit value corresponding to the higher magnitude bit value can be one, and the bit value corresponding to the lower magnitude bit value can be zero.

In some instances, the most significant bit for each of the entries can be arranged in the channel state information feedback report as an ordered group that precedes the one or more remaining bits of the respective entries. In some of these instances, the order in which the value of the most significant bit for each entry is positioned in the ordered group can define the order in which the respective one or more remaining bits of the entry are positioned within each corresponding group of one or more remaining bits, based upon the identified value of the respective most significant bit.

In some instances, the one or more remaining bits for the entries, which are in the group associated with the most significant bit having the lower magnitude bit value can be arranged into further subgroups, based upon a determined value of a next highest order bit in each of the entries from the one or more remaining bits. In some of these instances, the one or more remaining bits exclusive of the next highest order bit can be arranged in multiple groupings based on the determined value of the next highest order bit, where a further subgroup of the one or more remaining bits exclusive of the next highest order bit for entries where the next highest order bit has the higher magnitude bit value precede a further subgroup of the one or more remaining bits exclusive of the next highest order bit for entries where the next highest order bit has the lower magnitude bit value in the channel state information feedback report. Further, The further subgroups associated with a next highest order bit value corresponding to the lower magnitude bit value can be still further subdivided based upon multiple recursive iterations involving still further next most significant bit values for the associated entries.

In some instances, when a size of the channel state information feedback report exceeds an amount of resources available for communicating the channel state information feedback report to the network entity, the user equipment can transmit a truncated version of the channel state information report, where the entries omitted from the truncated version of the channel state information feedback report are the entries corresponding to the last one or more groups of the channel state information feedback report.

In some instances, the channel state information feedback report can include wide band parameters.

In some instances, the channel state information feedback report can include a bitmap that identifies non-zero coefficients.

In some instances, each entry can be bit encoded, and can include magnitude information and phase information. In some of these instances, the most significant bit for each of the entries can be associated with the most significant bit of the magnitude information. Further, the magnitude information of each of the entries can be based on one or more of a per-entry magnitude indicator, and a reference magnitude indicator, and wherein the reference magnitude indicator can be comprised of two reference magnitude values, where each value can be common for an exclusive subset of the set of entries, based on the value of one or more indices corresponding to each of the entries.

In some instances, the most significant bit of the set of entries can be listed in an order based on one or more of a permuted spatial domain basis index, a permuted frequency domain basis index, and a layer index In some instances, the information encoded in a beginning portion of the channel state information feedback report can be encoded with a higher error protection code relative to an end portion of the channel state information feedback report.

Figure 16:
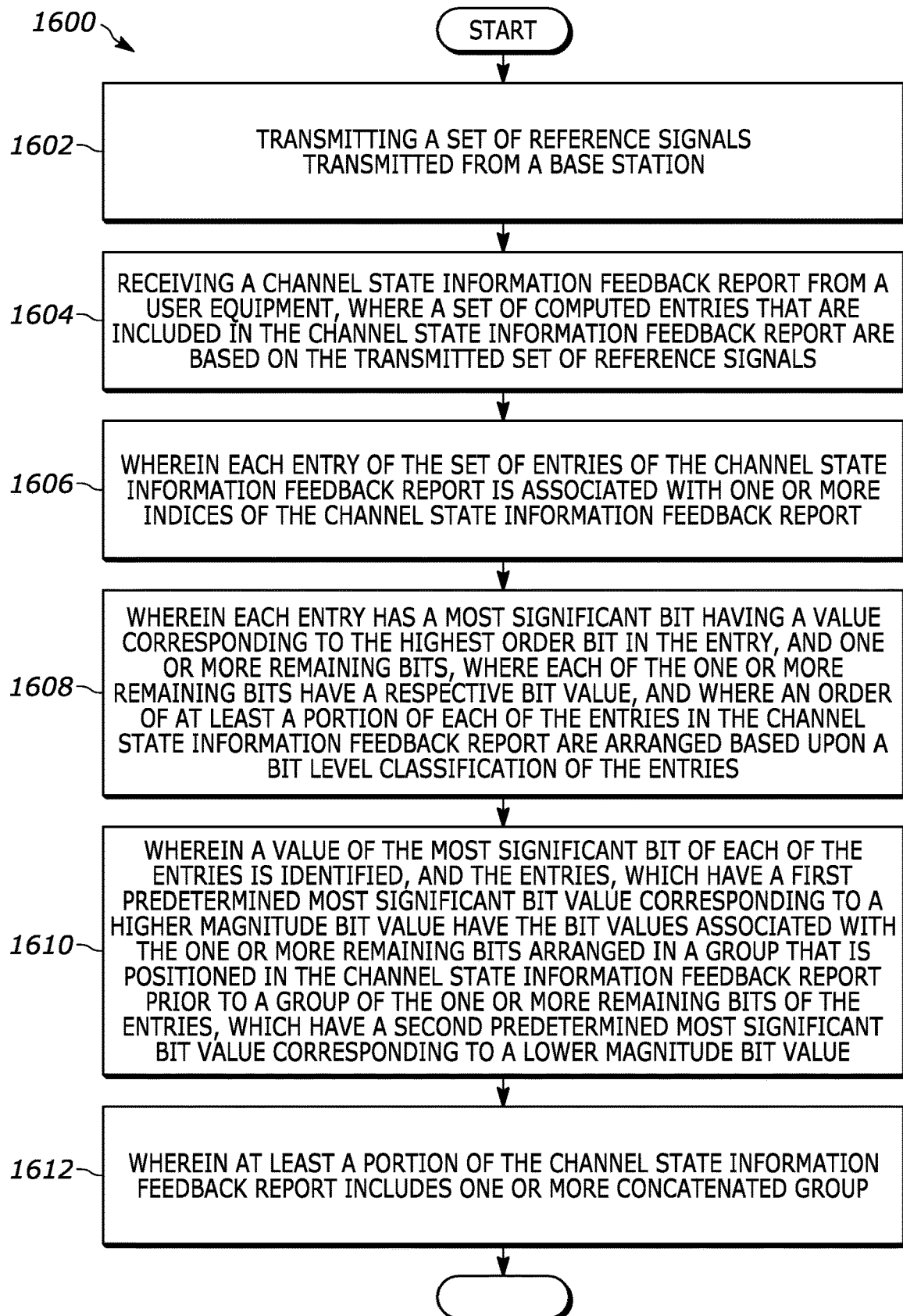
FIG. 16 is a flow diagram in a network entity for generating a channel state information report, which prioritized the location of the entries in the report based upon the value of one or more entry bits.

FIG. 16 illustrates a flow diagram 1600 in a network entity for generating a channel state information report, which prioritized the location of the entries in the report based upon the value of one or more entry bits. The method includes transmitting 1602 a set of reference signals transmitted from a base station. A channel state information feedback report is received 1604 from a user equipment, where a set of computed entries that are included in the channel state information feedback report are based on the transmitted set of reference signals. Each entry of the set of entries of the channel state information feedback report is associated with one or more indices of the channel state information feedback report 1606. Each entry has a most significant bit having a value corresponding to the highest order bit in the entry, and one or more remaining bits, where each of the one or more remaining bits have a respective bit value, and where an order of at least a portion of each of the entries in the channel state information feedback report are arranged based upon a bit level classification of the entries 1608. A value of the most significant bit of each of the entries is identified, and the entries, which have a first predetermined most significant bit value corresponding to a higher magnitude bit value have the bit values associated with the one or more remaining bits arranged in a group that is positioned in the channel state information feedback report prior to a group of the one or more remaining bits of the entries, which have a second predetermined most significant bit value corresponding to a lower magnitude bit value 1610. At least a portion of the channel state information feedback report includes one or more concatenated groups 1612.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 17:
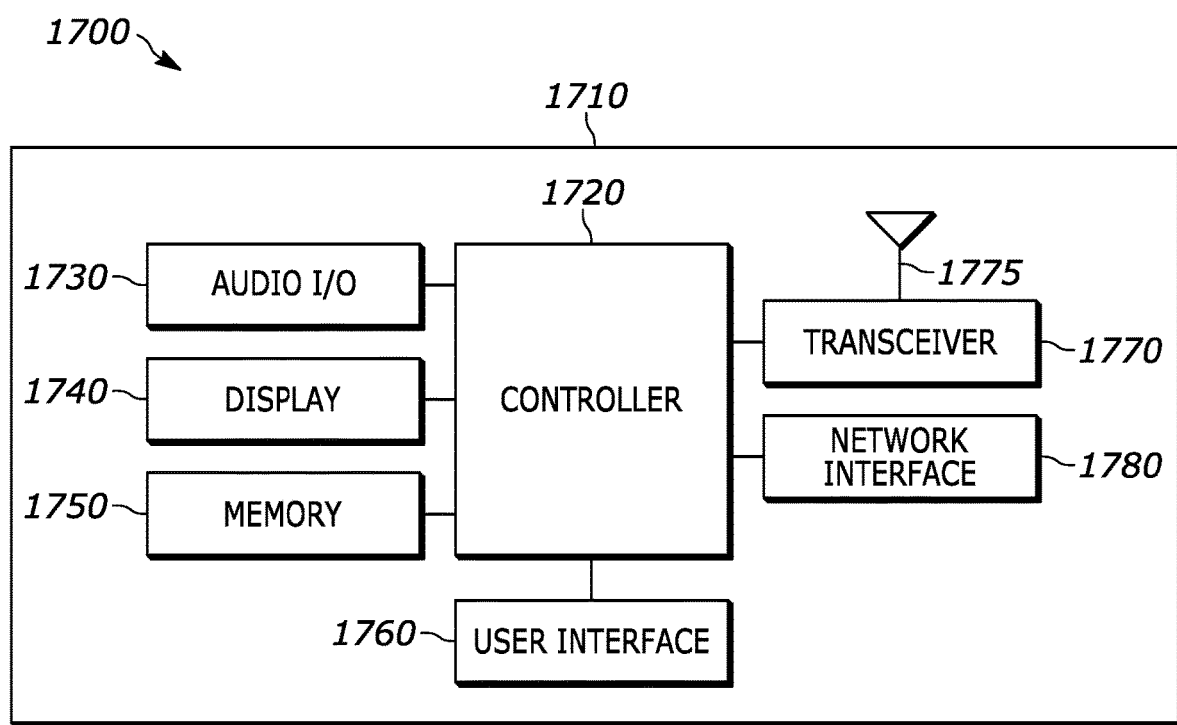
FIG. 17 is an example block diagram of an apparatus according to a possible embodiment.

FIG. 17 is an example block diagram of an apparatus 1700, such as the UE 110, the network entity 120, or any other wireless communication device disclosed herein, according to a possible embodiment. The apparatus 1700 can include a housing 1710, a controller 1720 coupled to the housing 1710, audio input and output circuitry 1730 coupled to the controller 1720, a display 1740 coupled to the controller 1720, a memory 1750 coupled to the controller 1720, a user interface 1760 coupled to the controller 1720, a transceiver 1770 coupled to the controller 1720, at least one antenna 1775 coupled to the transceiver 1770, and a network interface 1780 coupled to the controller 1720. The apparatus 1700 may not necessarily include all of the illustrated elements and/or may include additional elements for different embodiments of the present disclosure. The apparatus 1700 can perform the methods described in all the embodiments.

The display 1740 can be a viewfinder, a Liquid Crystal Display (LCD), a Light Emitting Diode (LED) display, an Organic Light Emitting Diode (OLED) display, a plasma display, a projection display, a touch screen, or any other device that displays information. The transceiver 1770 can be one or more transceivers that can include a transmitter and/or a receiver. The audio input and output circuitry 1730 can include a microphone, a speaker, a transducer, or any other audio input and output circuitry. The user interface 1760 can include a keypad, a keyboard, buttons, a touch pad, a joystick, a touch screen display, another additional display, or any other device useful for providing an interface between a user and an electronic device. The network interface 1780 can be a Universal Serial Bus (USB) port, an Ethernet port, an infrared transmitter/receiver, an IEEE 1394 port, a wireless transceiver, a WLAN transceiver, or any other interface that can connect an apparatus to a network, device, and/or computer and that can transmit and receive data communication signals. The memory 1750 can include a Random Access Memory (RAM), a Read Only Memory (ROM), an optical memory, a solid state memory, a flash memory, a removable memory, a hard drive, a cache, or any other memory that can be coupled to an apparatus.

The apparatus 1700 or the controller 1720 may implement any operating system, such as Microsoft Windows®, UNIX®, LINUX®, Android™, or any other operating system. Apparatus operation software may be written in any programming language, such as C, C++, Java, or Visual Basic, for example. Apparatus software may also run on an application framework, such as, for example, a Java® framework, a .NET® framework, or any other application framework. The software and/or the operating system may be stored in the memory 1750, elsewhere on the apparatus 1700, in cloud storage, and/or anywhere else that can store software and/or an operating system. The apparatus 1700 or the controller 1720 may also use hardware to implement disclosed operations. For example, the controller 1420 may be any programmable processor. Furthermore, the controller 1720 may perform some or all of the disclosed operations. For example, some operations can be performed using cloud computing and the controller 1720 may perform other operations. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 1720 may be any controller or processor device or devices capable of operating an apparatus and implementing the disclosed embodiments. Some or all of the additional elements of the apparatus 1700 can also perform some or all of the operations of the disclosed embodiments. At least some embodiments can provide a method and apparatus for generating a channel state information report, including the location of the entries in the report being organized based upon one or more selection criteria.

At least some methods of this disclosure can be implemented on a programmed processor. However, the controllers, flowcharts, and/or modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

At least some embodiments can improve operation of the disclosed devices. Also, while this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of" or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

What is claimed is:

1. A method in a user equipment for generating a channel state information feedback report, the method comprising:
   receiving a set of reference signals transmitted from a set of network entities;
   computing a plurality of entries that are included in the channel state information feedback report based on the received set of reference signals, wherein:
      the plurality of entries that are included in the channel state information feedback report include at least a set of coefficients; and each coefficient is associated with a set of indices including at least one spatial domain basis index, at least one frequency domain basis index, and at least one layer index; and arranging the plurality of entries that are included in the channel state information feedback report in an order known to both the user equipment and a network entity of the set of network entities, wherein:

higher prioritized entries are positioned toward a beginning of the order of the arranged plurality of entries and lower prioritized entries are positioned toward an end of the order of the arranged plurality of entries;

at least a portion of the channel state information feedback report includes one or more concatenated groups;

the plurality of entries that are included in the channel state information feedback report are prioritized using indices corresponding to the set of indices of the plurality of entries;

a subset of indices of the set of indices of the plurality of entries are permuted based on predefined permutations of spatial domain basis indices of the subset of indices;

a predefined permutation function of the predefined permutations of the spatial domain basis indices swaps a spatial domain basis index i* with a first spatial domain basis index and a spatial domain basis index $\mathrm{mod}_{2L}(i^*+L)$ with a last spatial domain basis index;

i* is the spatial domain basis index of a spatial domain basis containing a strongest coefficient;

L represents a total number of spatial domain basis indices; and $\mathrm{mod}_q(r)$ represents a modulo operation of an integer r with respect to a positive integer q.

2. The method in accordance with claim 1, wherein the set of indices which are used to prioritize the plurality of entries include a priority ordering that is based on the order of a higher priority of the at least one frequency domain basis index, then the at least one spatial domain basis index, and then the at least one layer index.

3. The method in accordance with claim 1, wherein the subset of indices that are permuted includes the at least one frequency domain basis index.

4. The method in accordance with claim 1, wherein the set of indices are used to prioritize the plurality of entries and include a priority ordering that is based on the order of a higher priority of the at least one spatial domain basis index, then the at least one frequency domain basis index, and then the at least one layer index.

5. The method in accordance with claim 1, wherein an additional predefined permutation function of the predefined permutations corresponding to an index of the subset of indices swaps a first value of the index with a second value of the index associated with the strongest coefficient.

6. The method in accordance with claim 1, wherein the plurality of entries that are included in the channel state information feedback report include a set of bitmap entries, and wherein each bitmap entry is associated with one or more of the at least one spatial domain basis index, the at least one frequency domain basis index, or the at least one layer index.

7. The method in accordance with claim 1, wherein when a size of the channel state information feedback report exceeds an amount of resources made available for communicating the channel state information feedback report to the network entity, the user equipment transmits a truncated version of the channel state information feedback report, and wherein entries omitted from the truncated version of the channel state information feedback report are the entries corresponding to a last one or more of one or more groups of the channel state information feedback report.

8. A method in a user equipment for generating a channel state information feedback report, the method comprising:

receiving a set of reference signals transmitted from a set of network entities;

computing a plurality of entries that are included in the channel state information feedback report based on the received set of reference signals, wherein:

the plurality of entries that are included in the channel state information feedback report include at least a set of coefficients; and each coefficient is associated with a set of indices including at least one spatial domain basis index, at least one frequency domain basis index, and at least one layer index; and arranging the plurality of entries that are included in the channel state information feedback report in an order known to both the user equipment and a network entity of the set of network entities, wherein:

higher prioritized entries are positioned toward a beginning of the order of the arranged plurality of entries and lower prioritized entries are positioned toward an end of the order of the arranged plurality of entries;

at least a portion of the channel state information feedback report includes one or more concatenated groups;

the plurality of entries that are included in the channel state information feedback report are prioritized using indices corresponding to the set of indices of the plurality of entries;

a subset of indices of the set of indices of the plurality of entries are permuted based on predefined permutations of spatial domain basis indices of the subset of indices;

the predefined permutations map the at least one frequency domain basis index from 0, M-1, 1, M-2, 2, . . . , [(M-1)/2] to 0, 1, 2, . . . , M-1, respectively;

M represents a total number of frequency domain basis indices; and an output of a ceiling operator [q] is a smallest integer value greater than or equal to a real value q.

9. The method in accordance with claim 8, wherein the mapping of the at least one frequency domain basis index is achieved using a permutation function including:

$$w=(2M-1).v+(-1)^0.2z,$$

wherein $$v=[(2z-M+1)/2M],$$

and wherein z represents a frequency domain basis index prior to permutation and w represents the frequency domain basis index after the permutation.

10. The method in accordance with claim 9, wherein using the permutation function includes the user equipment arranging the plurality of entries in accordance with a function including:

$$z=\mathrm{mod}_M((-1)^y.[y/2])$$

wherein y represents an original frequency domain basis index, where z represents a permuted frequency domain index, and $\mathrm{mod}_q(r)$ represents a modulo operation of an integer r with respect to a positive integer q.

11. A user equipment for generating a channel state information feedback report, the user equipment comprising:
   a transceiver that receives a set of reference signals transmitted from a set of network entities; and
   a controller that computes a plurality of entries that are included in the channel state information feedback report based on the received set of reference signals, wherein:
      the plurality of entries that are included in the channel state information feedback report include at least a set of coefficients;
      each coefficient is associated with a set of indices including at least one spatial domain basis index, at least one frequency domain basis index, and at least one layer index;
         the plurality of entries that are included in the channel state information feedback report are arranged by the controller in an order known to both the user equipment and a network entity, of the set of network entities;
      higher prioritized entries are positioned toward a beginning of the order of the arranged plurality of entries and lower prioritized entries are positioned toward an end of the order of the arranged plurality of entries;
      at least a portion of the channel state information feedback report includes one or more concatenated groups;
      the plurality of entries that are included in the channel state information feedback report are prioritized using indices corresponding to the set of indices of the plurality of entries;
      a subset of indices of the set of indices of the plurality of entries are permuted based on predefined permutations of spatial domain basis indices of the subset of indices;
      a predefined permutation function of the predefined permutations of the spatial domain basis indices swaps a spatial domain basis index i* with a first spatial domain basis index and a spatial domain basis index $\mathrm{mod}_{2L}(i^*+L)$ with a last spatial domain basis index;
      i* is the spatial domain basis index of a spatial domain basis containing a strongest coefficient;
      L represents a total number of spatial domain basis indices; and
      $\mathrm{mod}_q(r)$ represents a modulo operation of an integer r with respect to a positive integer q.

12. The user equipment in accordance with claim 11, wherein the set of indices which are used to prioritize the plurality of entries include a priority ordering that is based on the order of a higher priority of the at least one frequency domain basis index, then the at least one spatial domain basis index, and then the at least one layer index.

13. The user equipment in accordance with claim 11, wherein the subset of indices that are permuted corresponds to the at least one frequency domain basis index.

14. The user equipment in accordance with claim 13, wherein the predefined permutations map the at least one frequency domain basis index from 0, M-1, 1, M-2, 2, ..., [(M-1)/2] to 0, 1, 2, ..., M-1, respectively, M represents a total number of frequency domain basis indices, and an output of a ceiling operator [q] is a smallest integer value greater than or equal to a real value q.

15. The user equipment in accordance with claim 14, wherein the mapping of the at least one frequency domain basis index is achieved using a permutation function including:

$$w=(2M-1).v+(-1)^0.2z,$$

wherein $$v=[(2z-M+1)/2M],$$

and wherein z represents a frequency domain basis index prior to permutation and w represents the frequency domain basis index after the permutation.

16. The user equipment in accordance with claim 11, wherein the set of indices are used to prioritize the plurality of entries and include a priority ordering that is based on the order of a higher priority of the at least one spatial domain basis index, then the at least one frequency domain basis index, and then the at least one layer index.

17. The user equipment in accordance with claim 11, wherein an additional predefined permutation function of the predefined permutations corresponding to an index of the subset of indices swaps a first value of the index with a second value of the index associated with the strongest coefficient.

18. The user equipment in accordance with claim 11, wherein when a size of the channel state information feedback report exceeds an amount of resources made available for communicating the channel state information feedback report to the network entity, the user equipment transmits a truncated version of the channel state information feedback report, and wherein entries omitted from the truncated version of the channel state information feedback report are the entries corresponding to a last one or more of one or more groups of the channel state information feedback report.

19. A processor for wireless communication, comprising:
   receiving a set of reference signals transmitted from a set of network entities;
   computing a plurality of entries that are included in the channel state information feedback report based on the received set of reference signals, wherein:
      the plurality of entries that are included in the channel state information feedback report include at least a set of coefficients; and
      each coefficient is associated with a set of indices including at least one spatial domain basis index, at least one frequency domain basis index, and at least one layer index; and
   arranging the plurality of entries that are included in the channel state information feedback report in an order known to both the processor and a network entity of the set of network entities, wherein:
      higher prioritized entries are positioned toward a beginning of the order of the arranged plurality of entries and lower prioritized entries are positioned toward an end of the order of the arranged plurality of entries;
      at least a portion of the channel state information feedback report includes one or more concatenated groups;
      the plurality of entries that are included in the channel state information feedback report are prioritized using indices corresponding to the set of indices of the plurality of entries;

a subset of indices of the set of indices of the plurality of entries are permuted based on predefined permutations of spatial domain basis indices of the subset of indices;

a predefined permutation function of the predefined permutations of the spatial domain basis indices swaps a spatial domain basis index i* with a first spatial domain basis index and a spatial domain basis index $\mathrm{mod}_{2L}(i^*+L)$ with a last spatial domain basis index;

i* is the spatial domain basis index of a spatial domain basis containing a strongest coefficient;

L represents a total number of spatial domain basis indices; and $\mathrm{mod}_q(r)$ represents a modulo operation of an integer r with respect to a positive integer q.

20. The processor of claim 19, wherein the set of indices which are used to prioritize the plurality of entries include a priority ordering that is based on the order of a higher priority of the at least one frequency domain basis index, then the at least one spatial domain basis index, and then the at least one layer index.

* * * * *